Nov. 26, 1963
W. W. HARTMAN
3,112,236
LABELING MACHINE
Filed Aug. 4, 1960
10 Sheets-Sheet 1
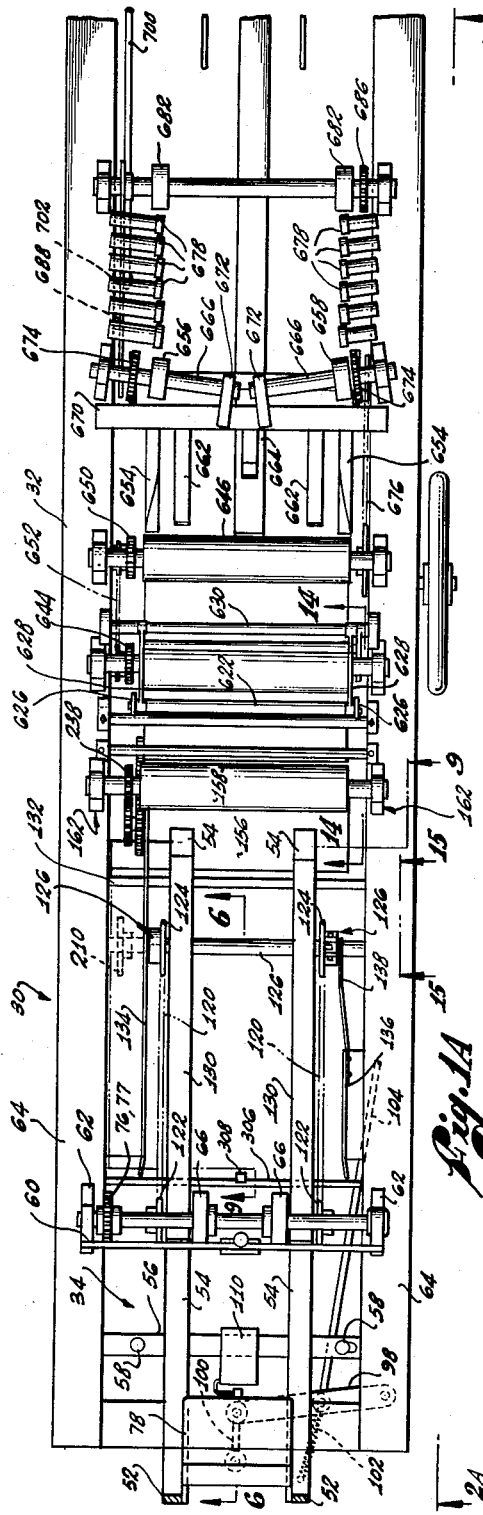
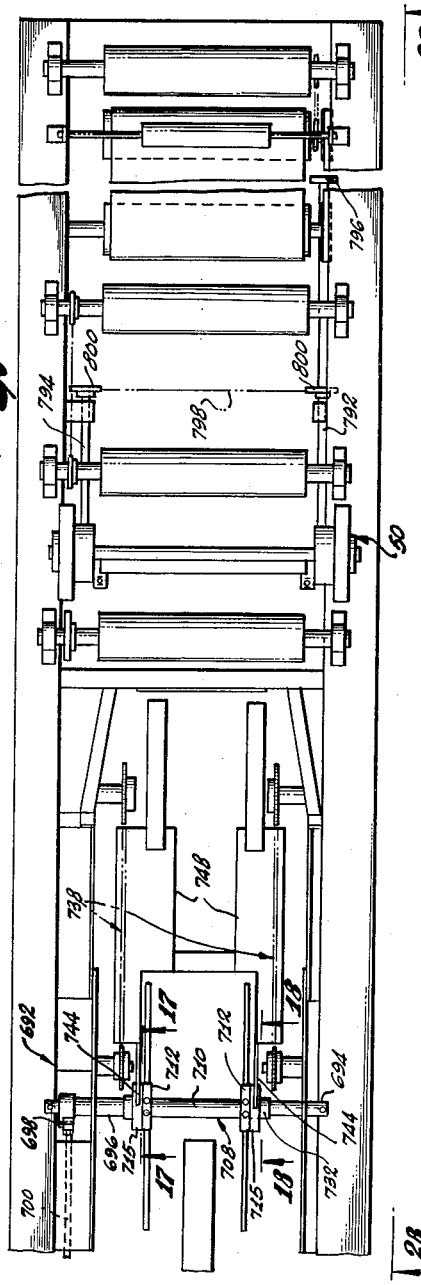
INVENTOR.
WILLIAM W. HARTMAN
BY Lilly & Nyhagen
ATTORNEYS

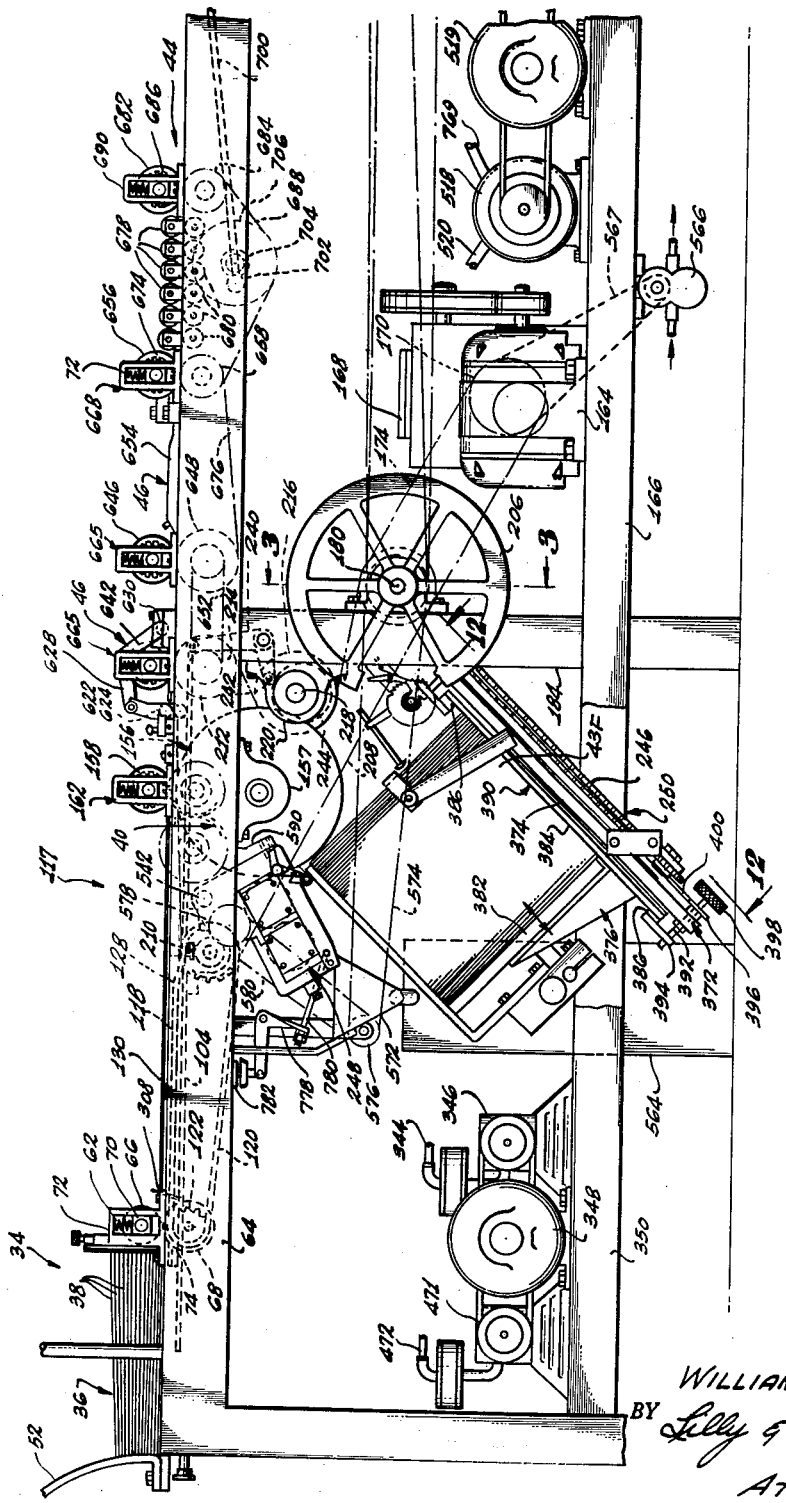

Nov. 26, 1963 W. W. HARTMAN 3,112,236
LABELING MACHINE
Filed Aug. 4, 1960 10 Sheets-Sheet 3
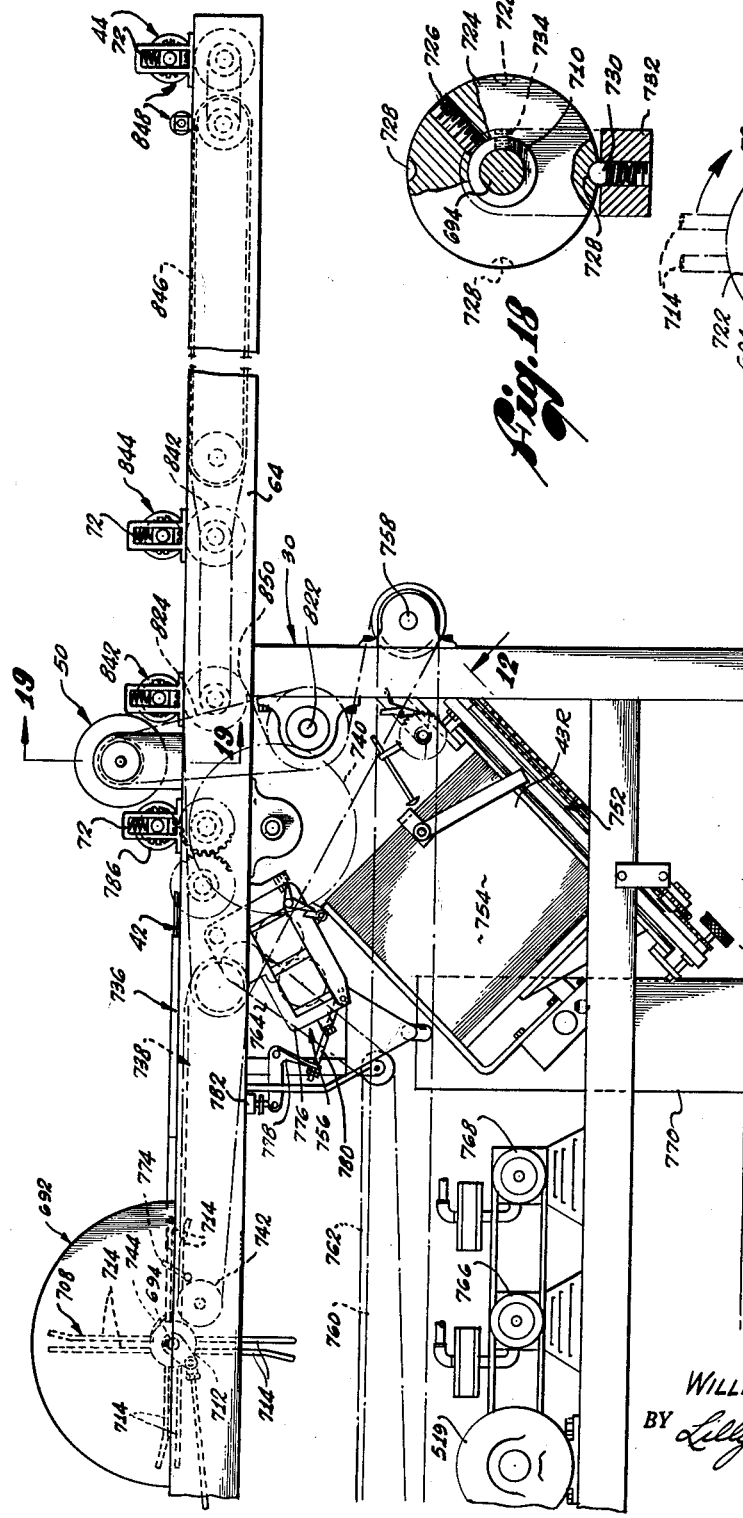
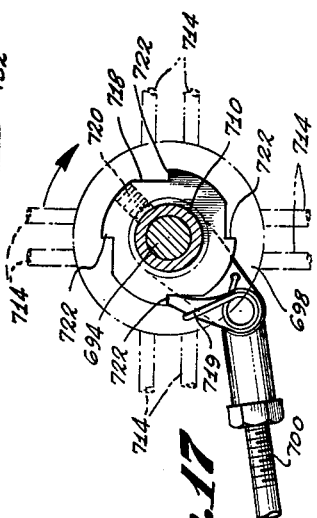
INVENTOR.
WILLIAM W. HARTMAN
BY Lilly & Nyhagen
ATTORNEYS Nov. 26, 1963   W. W. HARTMAN   3,112,236
LABELING MACHINE
Filed Aug. 4, 1960   10 Sheets-Sheet 4
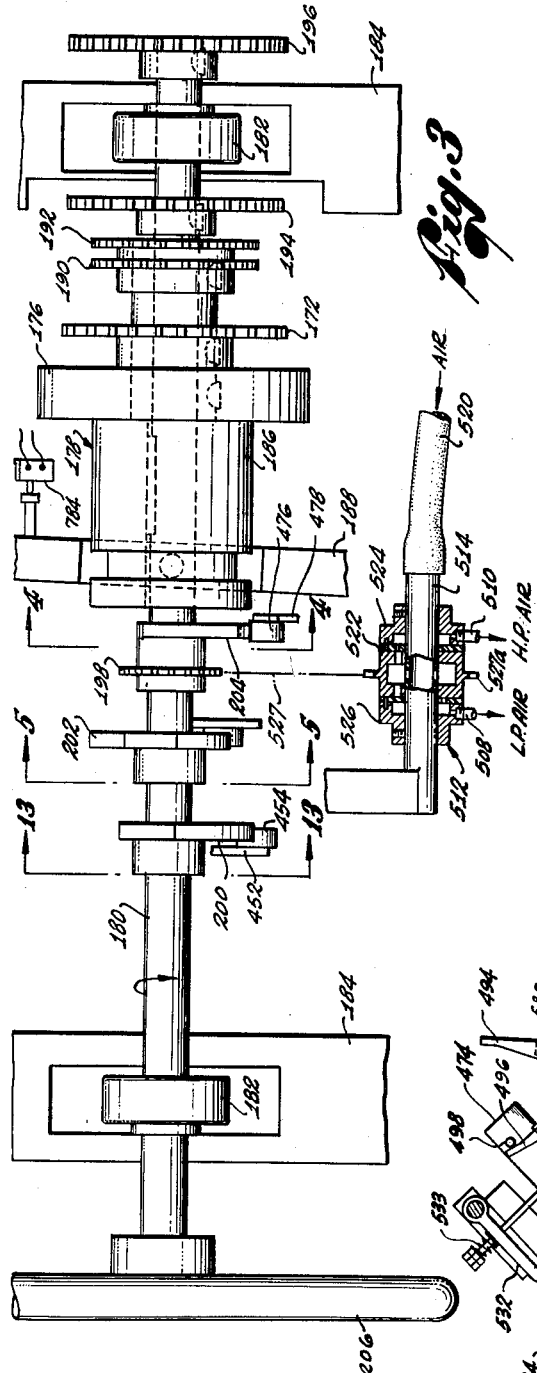
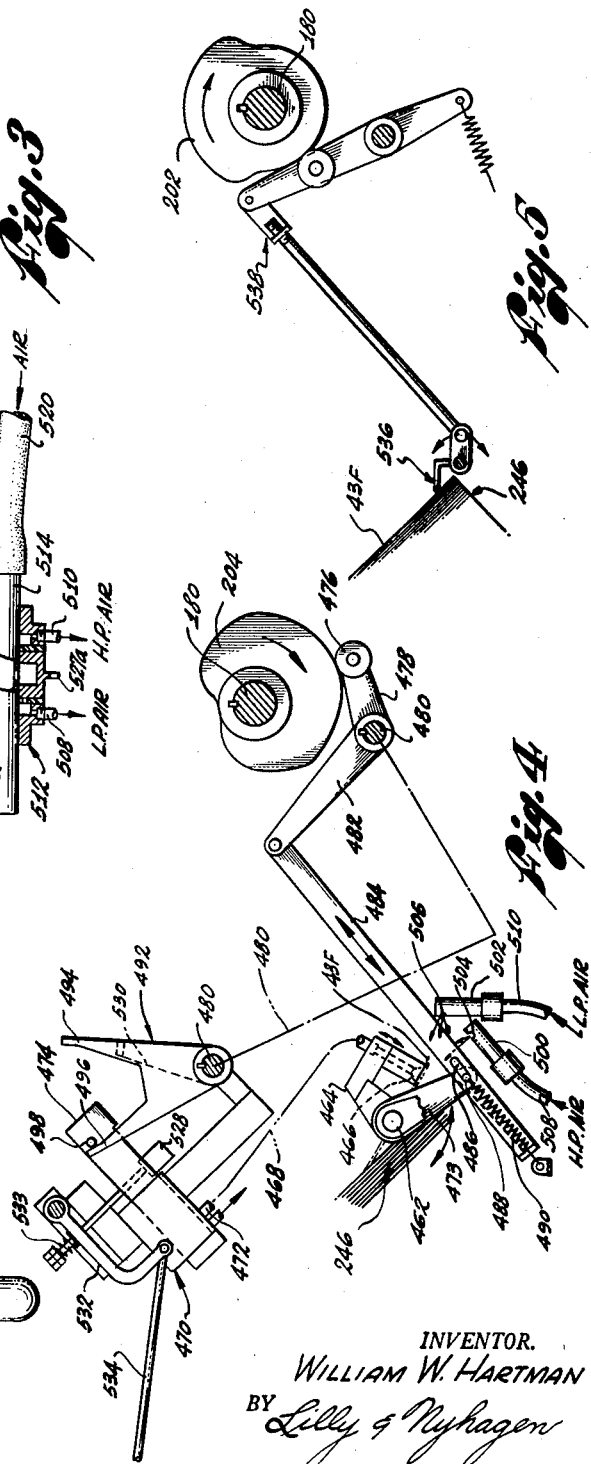
INVENTOR.
WILLIAM W. HARTMAN
BY Lilly & Nyhagen
ATTORNEYS

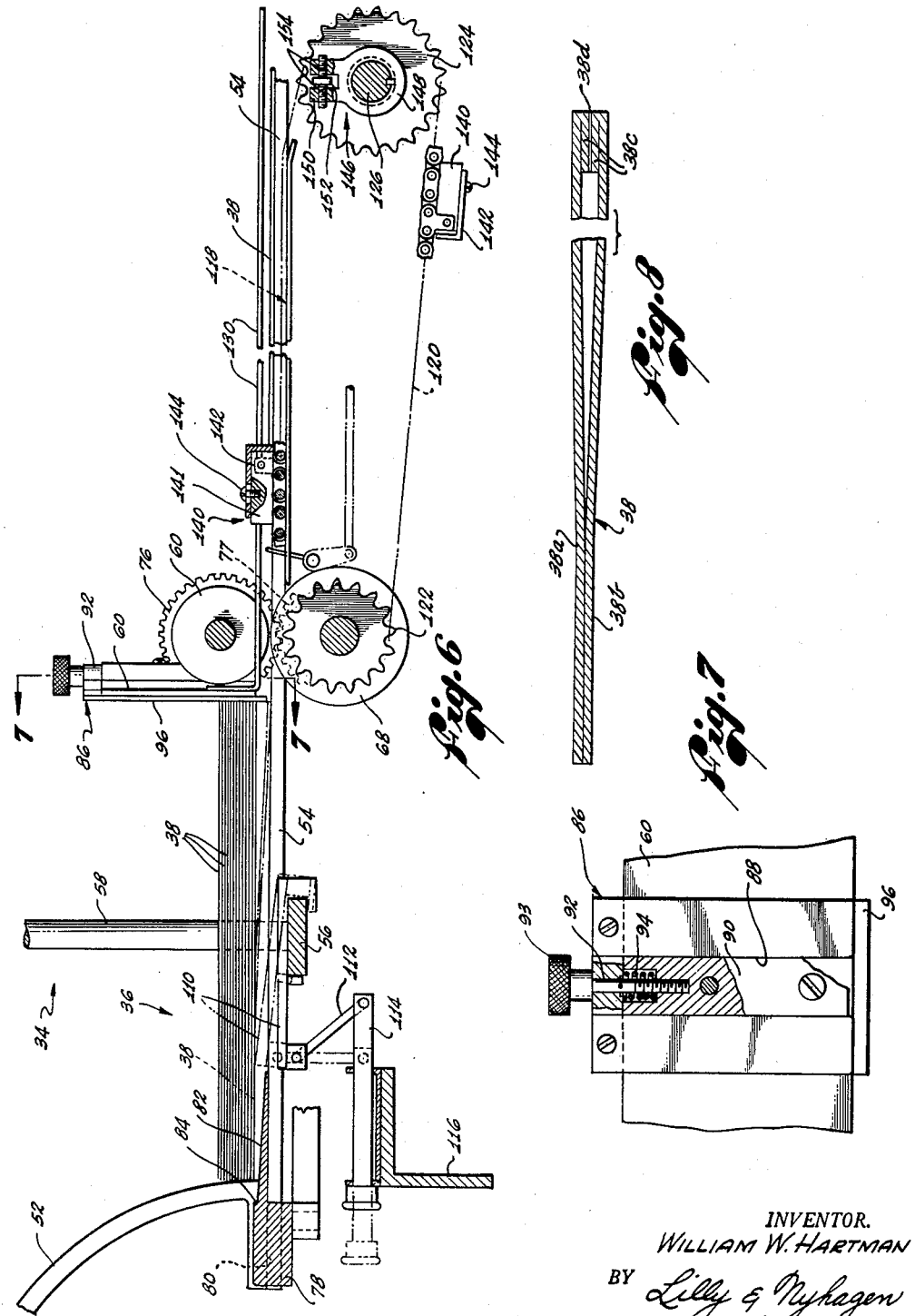

Nov. 26, 1963
W. W. HARTMAN
3,112,236
LABELING MACHINE
Filed Aug. 4, 1960
10 Sheets-Sheet 6
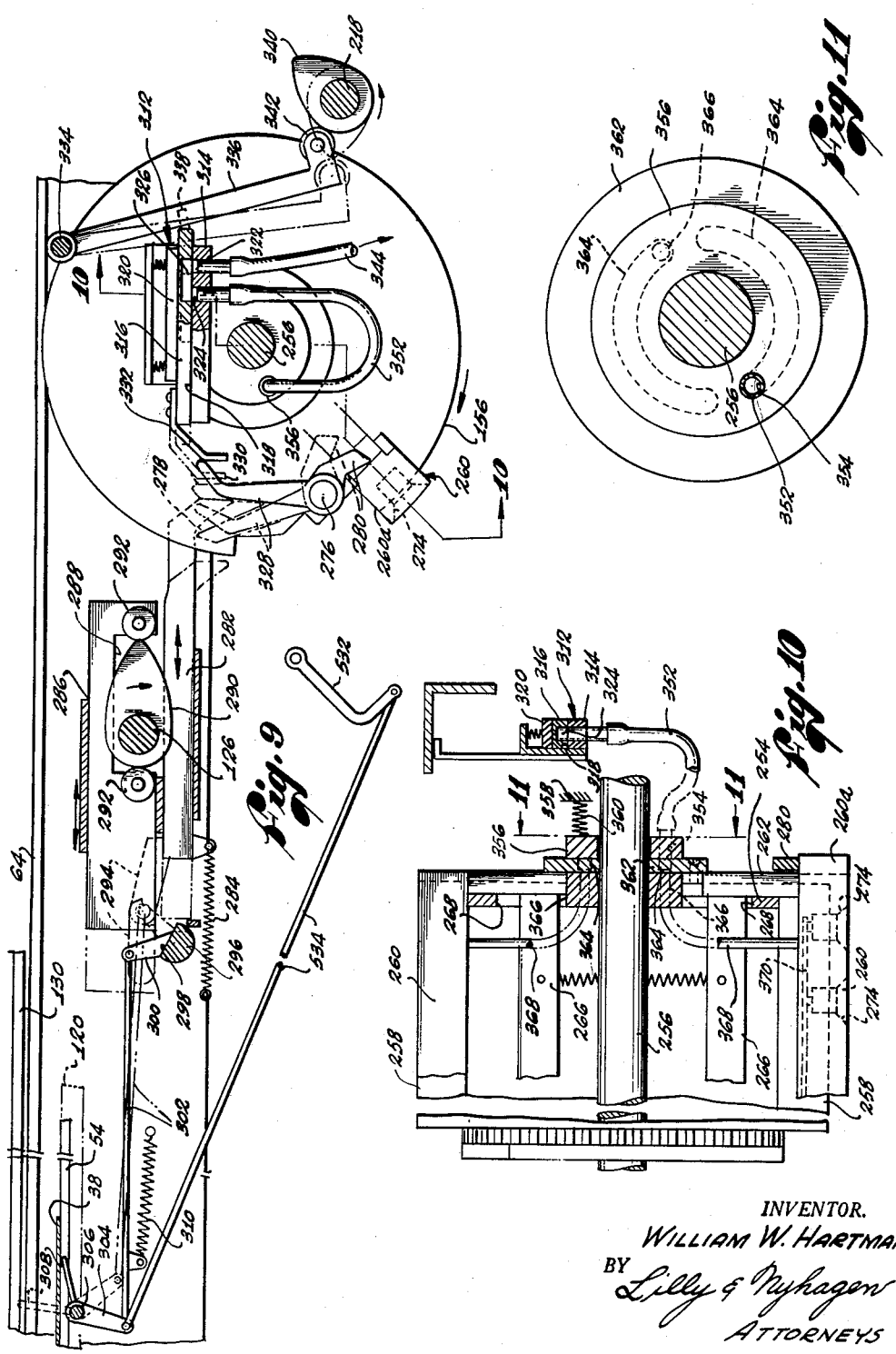
INVENTOR.
WILLIAM W. HARTMAN
BY Lilly & Nyhagen
ATTORNEYS

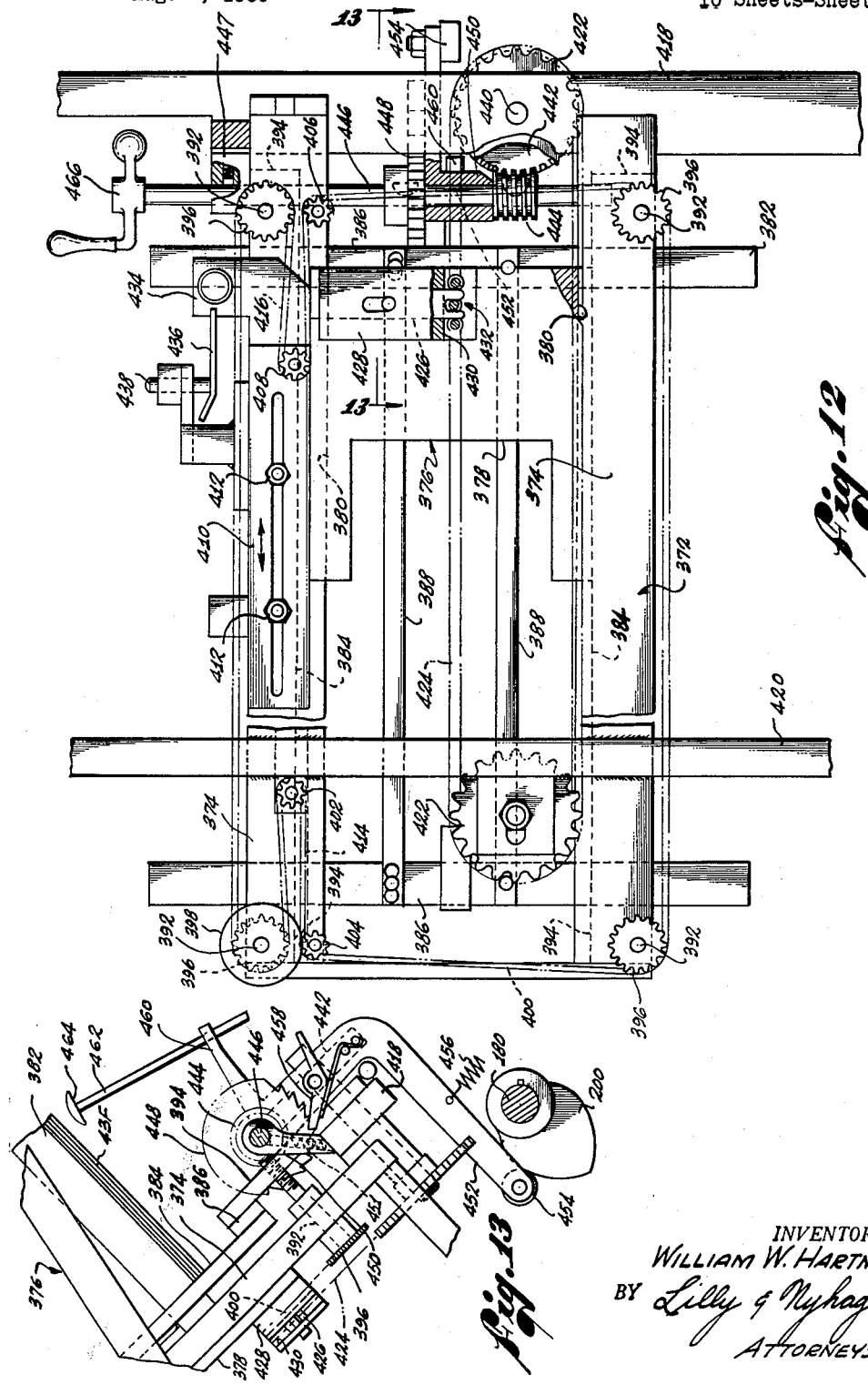

Nov. 26, 1963    W. W. HARTMAN    3,112,236
LABELING MACHINE
Filed Aug. 4, 1960    10 Sheets-Sheet 8
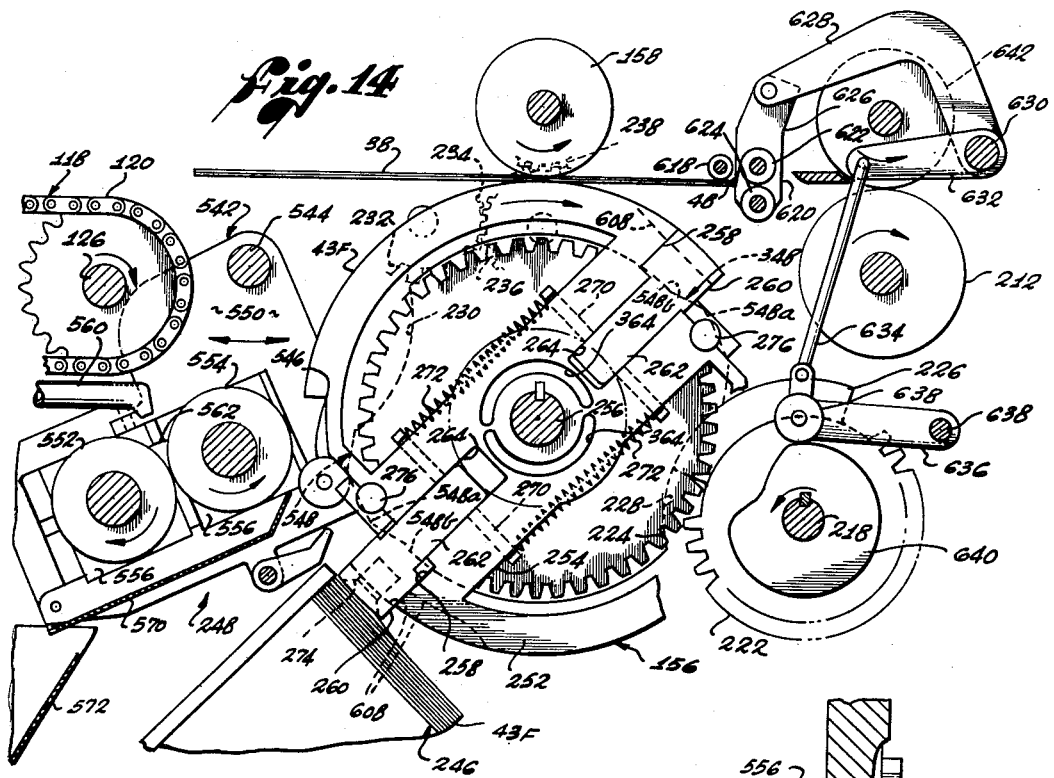
Fig. 14
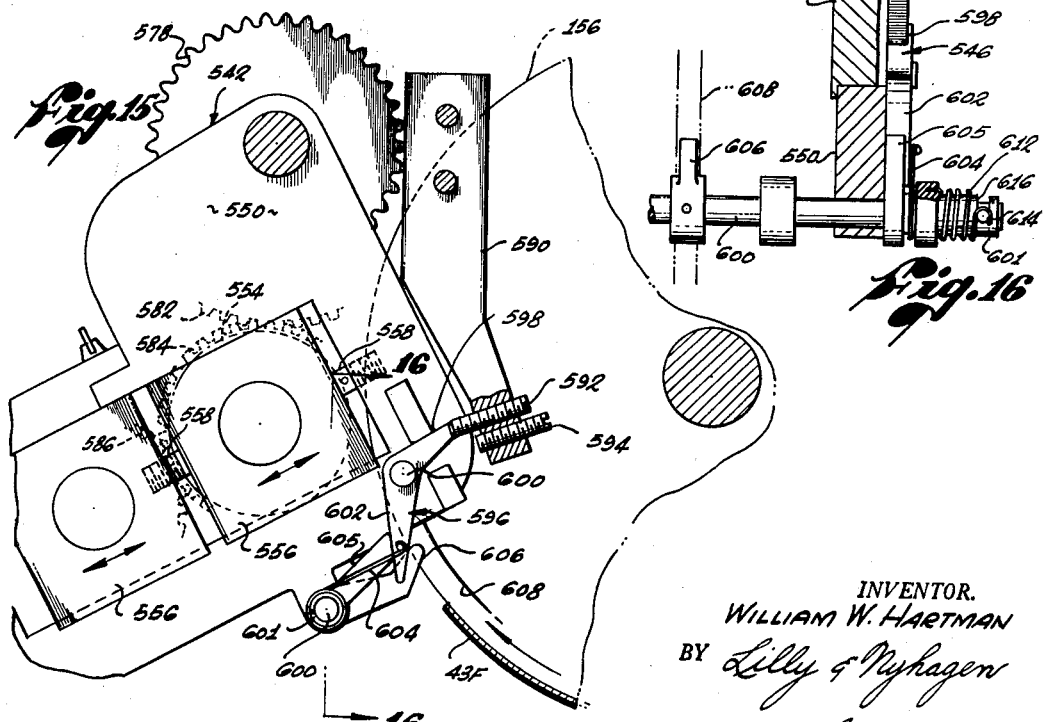
Fig. 15
Fig. 16
INVENTOR.
WILLIAM W. HARTMAN
BY Lilly & Nyhagen
ATTORNEYS Nov. 26, 1963 W. W. HARTMAN 3,112,236
LABELING MACHINE
Filed Aug. 4, 1960 10 Sheets-Sheet 9

INVENTOR.
WILLIAM W. HARTMAN
BY Lilly & Nyhagen
ATTORNEYS

Nov. 26, 1963
W. W. HARTMAN
3,112,236
LABELING MACHINE
Filed Aug. 4, 1960
10 Sheets-Sheet 10
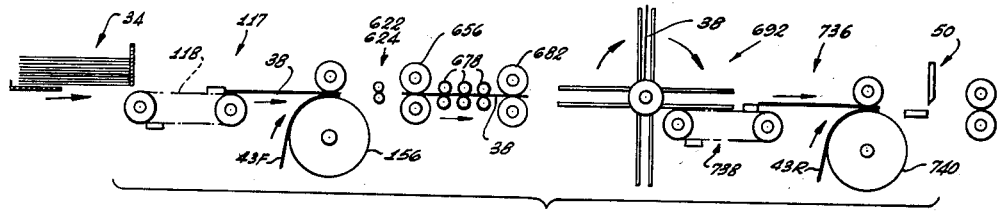
Fig. 21
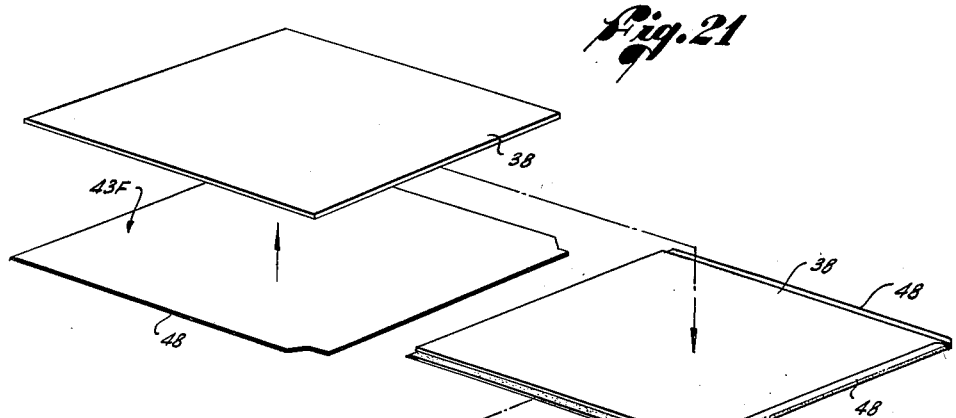
Fig. 22
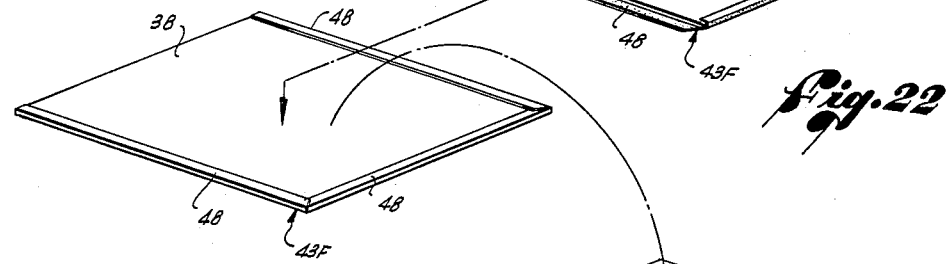
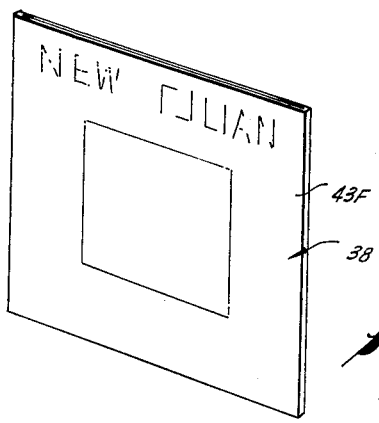
Fig. 23
INVENTOR.
WILLIAM W. HARTMAN
BY Lilly and Nyhagen
ATTORNEYS

United States Patent Office 3,112,236
Patented Nov. 26, 1963

3,112,236
LABELING MACHINE
William W. Hartman, 418 S. June St.,
Los Angeles, Calif.
Filed Aug. 4, 1960, Ser. No. 47,523
9 Claims. (Cl. 156—357)

This invention deals generally with labeling machines and, more particularly, with a machine for applying an adhesive label to each side of flat base members.

The present illustrative embodiment of the invention is a machine for applying the front cover label or sheet and the rear liner label or sheet to paperboard jackets of the type which are used to contain photograph records.

Thus, it is well known in the art that a record jacket is made by folding a rectangular, paperboard base in half, joining the side edges of the base to form a sleeve or jacket for receiving a phonograph record, and applying to one side of the jacket a cover sheet containing the title of the record as well as an appropriate art display and to the other side of the jacket a liner sheet containing printed descriptive information about the record. One of these sheets has narrow side flaps which are folded about the edges and against the reverse side of the jacket. Generally, one or more of the flaps bear a printed legend which must be accurately registered with the edge of the jacket so as to be readable when the jacket is viewed on edge.

It will become readily evident as the description proceeds that the invention is capable of embodiment in labeling machines for uses other than applying front covers and rear liners to record jackets. Accordingly, the present physical embodiment of the invention should be regarded as illustrative rather than limiting in nature.

With this preliminary discussion in mind, a general object of the invention may be stated as being the provision of a new and unique labeling machine for applying an adhesive label to each side of flat base members.

A more specific object of the invention is to provide a labeling machine of the character described which has provision for containing a supply of the members to be labeled as well as a supply of the labels and which operates, completely automatically, to periodically extract a base member from the supply thereof and then apply an adhesive label first to one side and then the other side of the member.

Another object of the invention is to provide a fully automatic labeling machine of the character described in which maximum simplicity of construction and operation and minimum cost of manufacture are attained by a unique mode of operation involving feeding of the base members past a first label-applying mechanism with one side of the members facing the mechanism, turning the members over, and feeding the inverted members past a second label-applying mechanism, all in such manner that each mechanism applies an ahesive label to the adjacent side of each base member as the latter moves past the respective mechanism.

Yet another object of the invention is to provide a labeling machine of the character described in which each label-applying mechanism is effective to periodically pick up a label from a stack of labels and advance the label past a glue applicator means into the path of an advancing base member for contact of the adhesively coated side of the label with the adjacent side of the base member and wherein, further, each mechanism is automatically deactivated in the event that a base member is not advancing toward the mechanism to receive a label whereby contamination of other parts of the machine with adhesive by feeding of an adhesively coated label through the machine by itself is prevented.

A further object of the invention is to provide a unique label applying mechanism for a labeling machine of the character described which is effective to periodically pick up a label from a stack of labels and advance the label past a glue applicator which applies adhesive to one side of the label.

Yet a further object of the invention is to provide a label-applying mechanism of the character described in which the labels are picked up by a unique suction action which is adjustable to attain an optimum suction force for the particular weight and type of paper on which the label is printed.

A further object of the invention is to provide a label-applying mechanism of the character described in which air is directed between the label being picked up from the stack and the next label so as to separate the labels and prevent the next label from adhering to and being removed from the stack with the first label.

A further object of the invention is to provide a label-applying mechanism of the character described in which the label feeder is a rotary drum and the glue applicator means are shifted toward and away from the drum in synchronism with its rotation so that adhesive is applied to a label carried on the drum but not to any part of the drum itself.

A further object of the invention is to provide a label-applying mechanism of the character described in which the glue applicator means are retained in a retracted position away from the label feeder in the event the latter fails to pick up a label from the stack of labels whereby contamination of the feeder with adhesive by contact with the applicator means is prevented.

A further object of the invention is to provide a label-applying mechanism of the character described embodying a unique means to maintain proper positioning of the stack of labels with respect to the label feeder.

A further object of the invention is to provide a labeling machine of the character described in which the base members are fed to the label-applying mechanisms by conveyor means which, and the means supporting the label stacks, are adjustable to attain accurate alignment of the labels on the base members.

A further object of the invention is to provide a labeling machine of the character described having provision for continuous recirculation of the adhesive through the glue applicator means while the machine is shut down and wherein the glue applicator means are automatically retracted from the label feeders upon shut down of the machine to prevent contamination of the feeders.

A further object of the invention is to provide a fully automatic machine for applying the front cover sheet and rear liner sheet to record jackets which automatically folds the side flaps on one sheet about the reverse side of its respective jacket and trims the open ends of the jackets.

Other objects, advantages, and features of the invention will become apparent as the description proceeds.

Briefly, these objects are attained in the illustrative embodiment of the invention by providing a labeling machine equipped with a frame mounting a storage means to contain a stack of record jackets, a first applicator mechanism to apply an adhesively coated front cover sheet to the jackets, a second applicator mechanism to apply an adhesively coated rear liner sheet to the jackets, a conveyor means for feeding the jackets in succession from the storage means past one applicator mechanism with one side of the members facing the mechanism, then turning the jackets over, and feeding the inverted jackets past the other applicator mechanism with the other sides of the members facing the latter mechanism, and means for operating the conveyor means and applicator mechanisms in synchronism in such manner that each mechanism picks up a sheet, from a stack thereof, feeds the sheet past a glue applicator means, and delivers it to the path of the advancing jackets at the proper time to meet a jacket. Each applicator mechanism then rolls the label onto the adjacent side of the jacket, the jacket then passing through pressure rollers which press the sheet and jacket into intimate contact, and finally past a trimming knife which trims off the mouth of the jacket.

One of the sheets, that is to say, either the front cover sheet or rear liner sheet, has side flaps which are folded, by a set of folding shoes and pressure rollers, about the side and bottom edges and against the reverse side of each jacket. One or more of these flaps bears a legend which must be accurately registered with the side edge of the jackets to permit the legends to be read when the jackets are viewed on edge. This accurate registration, as well as accurate alignment of the sheets as a whole with respect to the jackets, is achieved by certain unique adjustments of the conveyor means which feed the jackets to the applicator mechanisms and of the rack means which support the stacks of sheets.

Each applicator mechanism embodies a sheet feeder, which is illustratively a rotary drum, having suction pick-up means for picking up one edge of the top sheet in the stack. This suction means then holds the sheet to the feeder as the latter moves to carry the sheet past the glue applicator means into the path of the advancing jackets. These suction means are uniquely adjustable to adjust the suction force to suit the particular weight and type of paper of which the sheets are composed. The machine also embodies a unique system for directing air between the top sheet in each stack as it is picked up by the feeder and the next sheet to prevent the latter from adhering to and being carried from the stack with the top sheet.

Means are provided for deactivating each applicator mechanism in the event that a jacket is not advancing to the mechanism to receive an adhesive sheet so that feeding of adhesively coated sheets through the mechanisms by themselves, which would contaminate parts of the machine with the adhesive on the sheets, is prevented.

Also, the glue applicator means are advanced toward and away from the sheet feeders of the applicator mechanism in synchronism with movement of the feeders to assure contact of the applicator means with only sheets carried by the feeders. The glue applicator means are retained in their retracted position in the event of failure of a feeder to pick up a sheet from the stack as well as when the machine is shut down to avoid contamination of the feeders with glue. Means are provided to continuously recirculate the glue even when the machine is shut down to avoid setting of the glue.

The machine has numerous other novel features of design, construction, and operation as will become apparent from the following detailed description thereof when read in connection with the attached drawings, wherein:

FIG. 1A is a top plan view of the left-hand end of the present record jacket labeling machine;

FIG. 1B is a top plan view of the right-hand end of the machine;

FIG. 2A is a side view of the left-hand end of the machine looking in the direction of the arrows on line 2A—2A in FIG. 1A.

FIG. 2B is a side view of the right-hand end of the machine looking the direction of the arrows on line 2B—2B in FIG. 1B;

FIG. 3 is an enlarged section taken along line 3—3 in FIG. 2A;

FIG. 4 is an enlarged detail of the means for directing air between the top label or sheet in the stack of sheets and the next sheet when the top sheet is being picked up by the sheet feeder or rotary applicator drum of each applicator mechanism of the machine taken along line 4—4 on FIG. 3;

FIG. 5 is an enlarged detail of a sheet holddown in each applicator mechanism taken along line 5—5 of FIG. 3;

FIG. 6 is an enlarged section taken along line 6—6 in FIG. 1A;

FIG. 7 is a section taken along line 7—7 in FIG. 6;

FIG. 8 is an enlarged section through a record jacket to which a front cover and rear liner sheet are applied by this invention;

FIG. 9 is an enlarged section taken along line 9—9 in FIG. 1A;

FIG. 10 is a section taken along line 10—10 in FIG. 9;

FIG. 11 is a section taken along line 11—11 in FIG. 10;

FIG. 12 is an enlarged view looking in the direction of the arrows on line 12—12 in FIG. 2B;

FIG. 13 is a section taken along line 13—13 in FIG. 12;

FIG. 14 is an enlarged section taken along line 14—14 in FIG. 1A;

FIG. 15 is an enlarged section taken along line 15—15 in FIG. 1A;

FIG. 16 is a section taken along line 16—16 in FIG. 15;

FIG. 17 is an enlarged section taken along line 17—17 in FIG. 1B;

FIG. 18 is an enlarged section taken along line 18—18 in FIG. 1B;

FIG. 21 is a diagrammatic view of the machine illustrating its mode of operation;

FIG. 22 illustrates the successive steps involved in the machine in applying the cover and liner sheets to a record jacket; and FIG. 23 illustrates the completed jacket.

Figure 19:
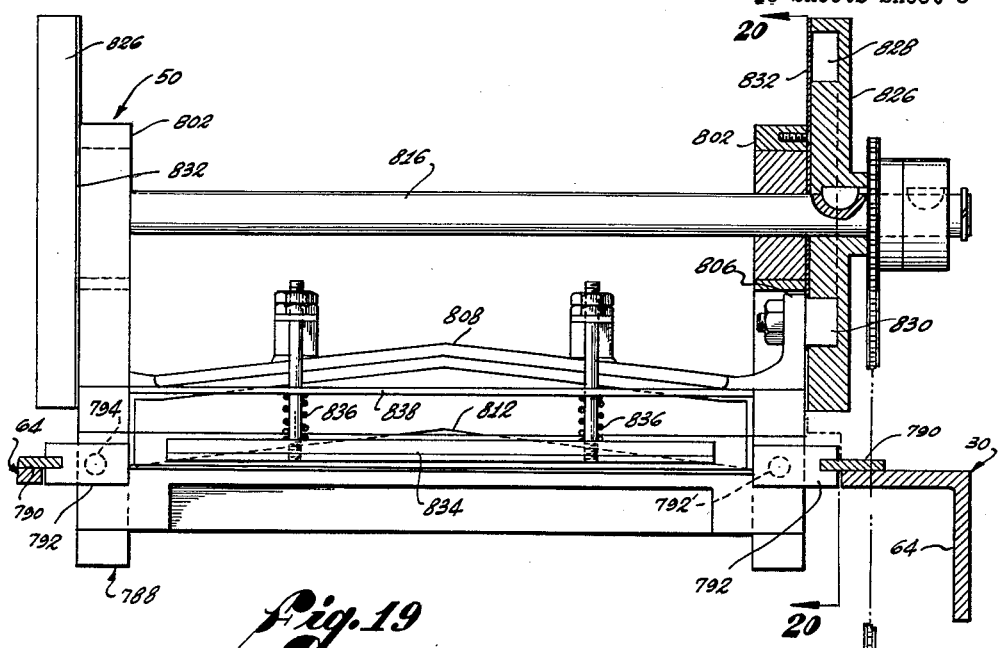
FIG. 19 is an enlarged section taken along line 19—19 in FIG. 2B.

The record jacket labeling machine illustrated in these drawings comprises a main, horizontal frame 30. Mounted on this frame are a left-hand storage means 34 to hold a stack 36 of record jackets 38 to be labeled, two label-applying mechanisms 40 and 42 for applying the front cover 43F and the rear liner sheets 43R to the record jackets 38, a conveyor means 44 for feeding record jackets in succession from the jacket storage means 34, over the first applicator mechanism 40 with the one side of each jacket facing downwardly toward the mechanism, then turning the jackets over and feeding them over the second applicator mechanism 42 with the other side of the jackets facing downwardly toward the second mechanism, folding means 46 between these mechanisms for folding side and end flaps 48 (FIG. 22) on the front cover sheets 43F about the edges and against the reverse sides of the jackets, a trimmer 50 following the second applicator mechanism 42 for trimming one edge of the labeled jacket, and several pressure rollers, to be identified shortly, spaced along the frame for pressing the applied cover and liner sheets into intimate contact with the jacket.

Briefly, the operation of the machine is as follows: Jackets 38 are periodically fed from the storage means 34 onto the conveyor means 44. This conveyor means feeds the jackets along a horizontal direction line parallel to the side edges of the plane of each jacket, with the open mouth of each jacket trailing, over the first applicator mechanism 40. Mechanism 40 delivers adhesively coated front cover sheets 43F into the path of movement of the jackets along the frame in synchronism with movement of the jackets in such a manner, to be presently more fully discussed, that each sheet is "rolled" onto the underside of a jacket, with the adhesive side of the sheet contacting the jacket, as the latter moves over the applicator mechanism. This step is diagrammatically illustrated in the upper part of FIG. 22.

Each jacket then passes through the folding means 46 which folds the side and end flaps 48 on the cover sheet about the edges and against the reverse side of the jacket, as diagrammatically illustrated in the middle portion of FIG. 22.

Between the two applicator mechanisms, each jacket is turned over, as diagrammatically shown in the lower part of FIG. 22, and is then fed in this inverted position over the second applicator mechanism 42. Applicator mechanism 42, which is identical to mechanism 40, delivers rear liner sheets, coated on one side with adhesive, into the path of and in synchronism with the movement of the inverted advancing jackets in such manner that each liner sheet is "rolled" onto the then underside of a jacket as the latter moves past the assembly, in the same manner as the cover sheets are rolled onto the jackets by the first applicator mechanism 40 and diagrammatically shown in the lower part of FIG. 22.

In the present, inverted position of the labeled jacket, the open mouth or end of the jacket leads. At trimmer 50, the jackets are momentarily stopped and the trimmer is operated to trim the open end of the jacket. The labeled and trimmed jacket then moves onto the outfeed end of the conveyor means 44 and is carried to the right end of the machine frame from where it is removed in any suitable way.

As mentioned earlier, the jackets move between several sets of pressure rollers during their movement along the frame in the manner just briefly described. These pressure rollers will be described shortly.

The construction of the machine will now be described in more detail.

The jacket storage means 34, which is shown in FIGS. 1A, 2A, 6 and 7, comprises a pair of upstanding, left-hand curved guides 52 which are fixed to the left-hand ends, respectively, of a pair of horizontal, longitudinally extending rails 54 which are rigid on the machine frame 30. Extending across the underside of the rails 54 is a support bar 56 mounting two vertical posts 58. Located some distance to the right of the curved guides 52 and posts 58 is a vertical plate 60 which extends crosswise of the frame 30 and is rigidly attached at its ends to bearing supports 62 which are bolted to the two longitudinally extending, laterally spaced channel members 64 which define the top of the frame.

As shown in FIGS. 2A and 6, the jackets 38 are stacked between the curved guides 52, posts 58 and plate 60 which confine the jackets therebetween. As shown in FIG. 8, each jacket comprises two sides 38a and 38b which are folded at one end to form inturned flanges 38c. These flanges are cemented together at 38d so as to close the right-hand end of the jacket as it is viewed in FIG. 8. The side edges (not visible in FIG. 8) of the jacket are joined in any suitable way, such as by a strip of adhesive tape. The left-hand end of the jacket, as it is viewed in FIG. 8, is left open to receive a record.

Because of the added thickness of the inturned flanges 38c, the jacket will be seen to be generally wedge shaped. As a result, when several jackets are stacked in the storage means 34, with the thick portions of the jacket to the right, the stack curves to the left, which curvature is accommodated by the curved guides 52.

Located just to the right of plate 60 are two vertically aligned pressure rollers 66 and 68 which are tangent to opposite sides of the horizontal plane which includes the upper surfaces of rails 54. The upper pressure roller 66 is journaled at its ends in bearing blocks 70 which are vertically slidable in the bearing supports 62. Springs 72 acting between the bearing supports and blocks urge the upper pressure roller 66 toward the lower roller 68.

The lower pressure roller 68 is rotatably supported at its ends in bearing blocks 74 fixed to the undersides of the horizontal flanges of channel frame members 64. Rollers 66 and 68 are drivably connected by meshing gears 76 and 77 so that when the lower roller is driven in the manner hereinafter described, the upper roller is also driven.

The bottom jacket in the stack of jackets contained in the storage means 34 is periodically pushed from the storage means to a position wherein its right-hand, thick edge is disposed between the pressure rollers 66 and 68 by means of a reciprocating slide or pusher plate 78. This plate has grooves 80 in its side edges to slidably receive the rails 54 so that the plate is slidable back and forth on the rails.

As shown best in FIG. 6, pusher plate 78 has a wedge-shaped, right-hand end defining an upper inclined ramp surface 82 terminating at its left-hand end in a vertical shoulder 84. The vertical dimension of this shoulder is just slightly less than the thickness of the open, left-hand end of a record jacket 38.

When a stack of record jackets are placed in the storage means or hopper 34, the lowermost jacket is supported on the rails 54. During right-hand movement of the pusher plate 78 from its left-hand, normal retracted position of FIG. 6, the ramp surface 82 is forced under the stack and elevates the left-hand end of the lower jacket slightly until the pusher plate shoulder engages the latter jacket. Continued right-hand movement of the pusher plate slides the lower jacket from the bottom of the stack to the aforesaid position of engagement of its right-hand, thickened end between the pressure rollers 66 and 68. The pusher plate is then retracted to its position of FIG. 6 in readiness to slide the next jacket from the bottom of the stack.

The second to the lowest jacket in the stack and the remainder of the jackets thereabove are restrained from movement to the right with the lower jacket by the plate or fence 60 and a bifurcated, vertically adjustable stop 86 which straddles the fence. The forward side of this stop, as it is viewed in FIG. 7, defines a slot 88 which slidably straddles a vertical guide or key 90 fastened to the fence 60 proper.

Extending through and restrained against axial movement in a crosspiece 92 at the top of the stop is an adjusting screw 93 which is threaded in the key 90. A spring 94 acts between the key and the crosspiece to urge the stop upwardly. The stop 86 may thus be vertically adjusted on the fence 60, to adjust the vertical spacing S in FIG. 6 between the lower end of the left-hand leg 96 of the stop and the horizontal plane of the upper surfaces of rails 54 by adjustment of the screw 93. The spacing S is set to be just slightly greater than the thickness of the right-hand end of a record jacket.

Thus, during right-hand movement of the pusher plate 78, the lower jacket in the stack can be pushed through the space S to the pressure rollers 66 and 68. The next upper jacket, however, is restrained against right-hand movement with the lower jacket by the stop.

Pusher plate 78 is reciprocated by a mechanism including an arm 98 which is pivoted at one end to a side frame member 64 and at the other end to the pusher plate through a pivotal link 100. A spring 102, acting between this arm and one of the rails 54, biases the pusher plate to its left-hand retracted position.

Pivotally attached to arm 98 is a link 104. Link 104 extends to the right on the machine frame and is driven in reciprocation, in a manner to be presently more fully described, to reciprocate pusher plate 78. This reciprocation of the pusher plate, of course, successively slides the jackets 38 from the hopper 34 to the pressure rollers 66, 68.

Loosely connected to the crossbar 56, so that it can rock vertically in the manner shown in FIG. 6, is a plate 110. A link 112 is hinged to the underside of this plate and to a horizontal shaft 114 which is slidably supported on the left-hand end cross member 116 of the machine frame 30. Shaft 114 is movable between its phantom line and solid line positions of FIG. 6 to elevate and lower the plate 110, as shown. Elevation of the plate to its phantom line position raises the stack of jackets in the hopper 34 sufficiently to enable the pusher plate 78 to move to the right without engaging the lower jacket in the stack. Thus, the plate 110 and its operating mechanism 112, 114 provide a means to discontinue feeding of jackets from the hopper while the remainder of the machine continues to operate.

Pressure rollers 66 and 68 form part of the conveyor means 44. This conveyor means comprises a first conveyor 117, including the latter pressure rollers, and a chain feed conveyor 118, as well as certain other conveyor components to be described shortly, which receives the jackets from the hopper 34 and conveys them in succession past the first applicator assembly 40.

Chain feed conveyor 118 comprises a pair of sprocket chains 120 which are trained about sprockets 122 on the shaft of the lower pressure roller 68 and sprockets 124 on a shaft 126 which is rotatably supported at its ends in bearing blocks 128 fixed to the underside of frame members 64. In FIG. 1A, sprocket chains 120 will be seen to be disposed just outwardly of horizontal holddown strips 130 which are secured at their left ends to the fence 60 and extend longitudinally of the frame just above the level of the upper runs of the chains. The right-hand ends of the strips are supported from the frame by a crosspiece 132.

Supported from one frame member 64 is a vertical, longitudinally extending side guide 134 located beyond the adjacent sprocket chain. On the other frame member 64 is a second, vertical side guide 136 having a leaf spring end 138 which bends toward the guide 134.

As shown best in FIG. 6, sprocket chains 120 mount a plurality of cleats 140 at spaced intervals consisting of hinged blocks 141 on which are seated L-shaped pusher plates 142. Plates 142 are secured to their respective blocks by screws 144 which extend through slots in the plates whereby the latter can be adjusted longitudinally of the chains and then locked in adjusted position.

During operation of the machine, a jacket is fed from the hopper 34 to the pressure rollers 66, 68 which then feed the jacket onto the sprocket chains 120 ahead of a set of cleats 140 which are aligned on the two chains 120. The pusher plates 142 on the following set of cleats, then, engage the left-hand edge of the jacket and feed the latter to the right toward the first applicator mechanism 40. The holddown strips 130 retain the jacket in contact with the cleats.

The above-described adjustment of the pusher plates 142 on the cleats affords a means to adjust the position of the jacket with respect to the sprocket chains for purposes of alignment of the cleats on the two chains 120 and timing, as will be hereinafter discussed. An additional timing and alignment adjustment is furnished by adjustable connections 146 between each of the sprockets 124 and their shaft 126. Each connection 146 comprises a hub 148 keyed to the shaft and having a bifurcated extension 150 loosely straddling a lug 152 on the adjacent sprocket. Set screws 154 threaded in the hub extension 150 seat against opposite sides of the sprocket lug 152 to lock the sprocket to the hub for rotation with the latter. It is evident, however, that the relative angular positions of the hub and sprocket may be adjusted by adjustment of the set screws 154. This adjustment, of course, changes the position of the cleats on the sprocket chains 120 with respect to the angular position of the sprocket shaft 126.

The first applicator mechanism 40, which receives the advancing jackets 38 from the conveyor chains 120, will now be described by reference to FIGS. 1A, 2A, 3–5 and 9–16.

This mechanism comprises a rotary sheet feeding and applicator drum 156 which is rotatably supported at its ends in bearing blocks 157 fixed to the underside of the frame members 64. Disposed above this drum is a pressure roller 158 which is rotatably supported at its ends in and spring urged toward the drum 156 by spring loaded bearing supports 162 which are identical to those (62, 70, 72) described earlier. Roller 158 and drum 156 are approximately tangent to the horizontal plane of the upper surfaces of rails 54 which terminate just short of the drum and along which the jackets slide when conveyed toward the drum by the chain conveyor 118. Accordingly, the jackets are fed from the latter conveyor to a position between the drum and its pressure roller 158 which are, in turn, driven in rotation to feed the jackets past the drum. In effect, theerfore, the pressure roller 158 forms a part of the first conveyor 117, mentioned earlier.

The parts of the machine thus far described are driven from a main drive motor 164 which is mounted on a lower table 166 on the frame 30. Motor 166 drives a gear reduction unit 168, the output shaft of which mounts a sprocket 170. Trained about this sprocket and a sprocket 172 (FIG. 3) is a sprocket chain 174.

Referring to FIG. 3, sprocket 172 will be seen to be rigid on the driving member 176 of a clutch 178 carried on a shaft 180. This shaft is journaled at its ends in bearings 182 which are attached to a pair of frame supporting legs 184 located at opposite sides of the frame.

The driven part 186 of clutch 178 is slidably keyed to shaft 180 and is moved axially toward and away from the driving clutch part 176, to engage and disengage the clutch, by a lever 188 which is pivoted on the frame 30 and operatively connected to the driven clutch part in the conventional manner shown.

Keyed to the driving clutch part are a pair of sprockets 190 and 192. Keyed to shaft 180 are three sprockets 194, 196 and 198 and three cams 200, 202 and 204. The function of these sprockets and cams will appear as the description proceeds. Suffice it to say at this point that when clutch 178 is disengaged, sprockets 190 and 192 are driven, along with the driving clutch part 176, from the gear reducer 168. Shaft 180, and the sprockets 194, 196 and 198 and cams 200, 202 and 204 keyed thereto, is driven from the gear reducer only when the clutch 178 is engaged. Fixed to the shaft is a handle 206 by which it may be manually rotated.

Referring now again to FIG. 2A, a sprocket chain 208 is trained about the clutch shaft sprocket 194 and about a sprocket 210 on the chain conveyor drive shaft 126, then about a sprocket 212 on a pressure roller 214 rotatably supported on frame 30, then about a sprocket 216 keyed on a shaft 218 which is rotatably supported by bearings 220 attached to frame legs 184, and then back to the clutch shaft sprocket 194. When clutch 178 is engaged, therefore, chain conveyor 118, pressure rollers 66 and 68 which are driven from the chain conveyor, pressure roller 214, and shaft 218 are driven in rotation.

Referring now to FIG. 14, it will be seen that shaft 218, which is driven as just described, has keyed thereon an interrupted gear 222 which meshes with a gear 224 on the rear end of the applicator drum 156 as it is viewed in FIG. 14. These gears 222 and 224 form a conventional intermittent gear drive for the drum which imparts 180° of rotation to the drum, in the direction indicated, during each complete revolution of the shaft 218 and gear 222 thereon.

Formed on the rear side of the intermittent driving gear 222 is a cylindric locking segment 226 which is engageable in two diametrically opposed, cylindric locking recesses 228 and 230, formed in a plate fixed to the rear side of the drum intermittent gear 224, to lock the drum in a fixed angular position in the well-known way.

Thus, during rotation of shaft 218 through part of a revolution from the position of FIG. 14, the drum remains locked in its illustrated position by engagement of the locking segment 226 in locking recess 228. Thereafter, the teeth on the driving intermittent gear again engage the intermittent gear 224 on the drum and the locking segment 226 is withdrawn from the locking recess 228 to rotate the drum through 180°. The teeth of the driving gear 222 then again disengage the drum gear 224 and the locking segment 226 engages in the locking recess 230 to again lock the gear in its 180° position. Later the drum is rotated through another 180° back to the position shown and momentarily locked in that position.

Thus, during rotation of shaft 218, by engagement of clutch 178, the drum is intermittently driven through 180° and is alternately held stationary in the position shown in FIG. 14 and a position 180° away from that position.

Rotatably supported on the frame 30 at the rear end of the drum 156, as the latter is viewed in FIG. 14, is a gear 232 which meshes with the drum gear 224 and is integral with a coaxial, smaller pitch gear 234. This latter gear meshes with a gear 236 which is also rotatably supported on the frame 30 and meshes with a gear 238 on the shaft of the drum pressure roller 158. Thus the pressure roller 158 is intermittently driven with but in the opposite direction to the drum.

Pivotally supported on the forward frame leg 184 is a bell crank lever 240. One leg of this lever extends over the intermittent gear drive shaft 218 and mounts a cam follower roller 242. This roller rides on a cam 244 keyed to the shaft 218. The other leg of the bell crank lever 240 extends upwardly toward the top of the frame and is pivotally connected at its upper end to the right-hand end of the pusher plate operating link 104 described earlier in connection with the record jacket hopper 34. Thus, when the intermittent gear drive shaft 218 is driven in rotation from the clutch shaft 180, by engagement of clutch 178, the bell crank 240 is oscillated to reciprocate the record jacket hopper pusher plate 78 and thereby periodically feed jackets from the hopper, as already discussed. It is evident that the bell crank cam follower roller 242 is held against its cam 244 so that the bell crank will be oscillated by the cam by the pusher plate return spring 102.

Up to this point, then, we have seen that when the clutch 178 is engaged, record jackets are periodically fed from the hopper 34 onto the infeed chain conveyor 118 and are conveyed by the latter toward the first applicator mechanism 40 to a position where the thick, leading edge of each successive jacket is received between the applicator drum 156 and its pressure roller 158. The chain conveyor movement and intermittent drum rotation are timed so that the drum and its pressure roller commence to rotate through their next half revolution just shortly before the leading edge of each jacket is fed between the drum and its pressure roller by the infeed chain conveyor 118. The respective set of cleats 140 on the conveyor chains 120 then immediately drop out of engagement with each jacket which containues to be fed past the drum by continued rotation of the latter and its pressure roller through the remainder of the half revolution of the drum.

During each half revolution of the drum, the latter picks up a cover sheet 43F from a stack 246 of sheets, and carries the sheet past a glue applicator means 248 which applies adhesive to the outer surface of the sheet. The drum then delivers the adhesively coated sheet into the path of the adjacent advancing record jacket 38 at just the right time to meet the advancing jacket, whereupon the adhesive cover sheet is, in effect, "rolled" onto the underside of the jacket as the latter is fed past the drum between the latter and its pressure roller, as will now be described.

The stack 246 of sheets 43F is supported on a rack 250 which holds the sheets with their edges aligned and the planes of the sheets approximately parallel to the axis of the applicator drum 156 and inclined to the horizontal, as shown. The upper left-hand edge of the stack 246, as the latter is viewed in FIGS. 2A and 14, is disposed in an inclined plane parallel to and passing just above the axis of the drum 156. The upper edge portion of the uppermost sheet in the stack is disposed directly opposite and spaced slightly from the surface of the drum, as shown.

The drum itself comprises a hollow, generally cylindrical casting having a cylindrical shell 252. Extending across the open ends of this shell are cross members 254 through which the drum shaft 256 extends and which are keyed to this shaft.

The surface of the drum shell 252 has two diametrically opposed, axially extending slots 258 in each of which is slidably fitted a pick-up bar 260. Rigidly joined to each end of each pick-up bar 260 is a radially inwardly extending guide shoe 262 which is slidably guided in a radial slot 264 in the adjacent end cross member 254 of the drum. The pick-up bars 260 are thereby supported on the drum for radial movement between the extended position in which the lower pick-up bar 260 is shown in FIG. 14 and the retracted position in which the upper bar 260 is shown in that figure.

Extending axially through the inside of the drum are two crossbars 266. The ends of each crossbar extend slidably through radial slots 268 in the drum end cross members 254 and are attached to the adjacent pick-up bar guide shoes 262. Extending through these crossbars 266 are pins 270. Springs 272 are connected between these pins, as shown, to yieldably retain the pick-up bars in their retracted positions.

Each pick-up bar is formed with several longitudinally spaced, radially outwardly opening suction cups 274. As will presently be described, in each of the two half revolution positions in which the applicator drum 156 is momentarily held stationary during its intermittent rotation by the intermittent drive 222—230, one of the pick-up bars 260 is aligned with the upper edge portion of the upper sheet 43F in the stack 246 of sheets, as is shown in FIG. 14. Immediately after the drum is brought to rest in one of these positions, the pick-up bar 260 adjacent the stack is extended and the suction cups 274 on that bar are evacuated to pick up the upper sheet, as shown in FIG. 14. Directly thereafter, the pick-up bar is allowed to retract under the action of the pick-up bar return springs 272. During the following half revolution of the drum, the top sheet is withdrawn from the stack and carried around with the drum, as briefly discussed earlier.

The pick-up bars are extended and the suction cups are evacuated as follows: Extending through the drum for the full length thereof and through and beyond the cross members 254 on the drum ends are a pair of shafts 276 which are located adjacent the pick-up bars 260, respectively, and rotatably supported in the end members 254. Keyed on the far end of each shaft, as viewed in FIG. 9, is a long arm 278. Keyed on the near end of each shaft is a short arm 280 which engages behind an extension 260a on the near end of the adjacent pick-up bar 260. Accordingly, when either arm 278 is rocked in the clockwise direction in FIG. 9, its respective short arm rocks against the adjacent pick-up bar 260 to extend the latter, against the action of the pick-up bar return springs 272, to the position occupied by the lower pick-up bar in FIG. 9. When the lever 278 is released, of course, the extended pick-up bar is retracted by these springs.

As discussed earlier, during operation of the machine, drum 156 is intermittently rotated through one half revolution and periodically is held stationary in the position shown in FIG. 9 and a position spaced 180° from that position.

When the drum is in each of these positions, the lever 278 for the pick-up bar 260 then disposed adjacent to the stack 246 of sheets 43F is rocked, to momentarily extend the bar, by a reciprocating slide bar 282.

Slide bar 282 is slidably supported on the rear frame members 64 of the main frame 30 for right and left hand reciprocating movement, as indicated by the arrows in FIG. 9. When the drum 156 is in either of its stationary positions, the lever 278 for the pick-up bar 260 then adjacent the stack 246 is disposed in the path of right-hand movement of the slide bar so that the lever is rocked in the clockwise direction, to extend the adjacent pick-up bar 260 toward the top sheet 43F on the stack, upon right-hand movement of the slide bar.

When the slide bar 282 moves to the left, under the action of a return spring 284, connected between the slide bar and the adjacent frame member 64, the lever 278 is released to permit retraction of the extended pickup bar by the pick-up bar return springs 272.

Slide bar 282 is moved to the right against the action of its return spring 284, by a reciprocating slide 286. This slide is slidably mounted on the frame member 64 just above the slide bar 282. Slide 286 has a cutout 288 through which the chain conveyor drive shaft 126 extends. Keyed to this shaft is a cam 290 which cooperates with a pair of cam follower rollers 292 on the slide 286 to reciprocate the latter in the directions indicated when the shaft 126 turns.

Pivoted on the slide 286 is a notched pawl 294 which is adapted to engage the left-hand end of the slide bar 282, as shown in solid lines in FIG. 9, so as to move the slide bar to the right with the slide.

Pivotally mounted on the frame member 64 to the left of slide bar 282 is a generally semicylindric cam 296 having a flat, upper surface 298. Cam 296 has an arm 300 which is located out of the path of reciprocation of slide 286 and is hinged to one end of a rod 302. The other end of rod 302 is hinged to a second arm 304 keyed on a shaft 306. As shown in FIG. 1A, shaft 306 extends across the frame 30 just to the right of the first feed rollers 66, 68. The shaft is rotatably supported at its ends in the frame 30.

Keyed on the center of shaft 306, between the sprocket chains 120 of the infeed chain conveyor 118, is a plate or trip 308. This trip is normally retained in its upright, phantom line position of FIG. 9 by a spring 310 connected between the rod 302 and frame member 64. In this position, the trip extends across the path of movement of the record jackets 38 along the rails 54 as they are advanced by the feed rollers 66, 68 onto the chains 120 of the chain conveyor 118. Accordingly, the jackets depress the trip to its solid line position as they feed onto the conveyor chains 120.

In the normal untripped phantom line position of trip 308, the cam 296 occupies its phantom line position of FIG. 9. The cylindric surface of the cam then engages the underside of the pawl 294, when the slide 286 and slide bar 282 are at the left-hand, phantom line limiting position of their stroke. During the subsequent right-hand stroke of slide 286, therefore, the pawl is retained in its upper, phantom line position by the cam and does not engage the left end of slide bar 282. The slide bar thus remains stationary in its left-hand, phantom line position during the right-hand stroke of the slide 286 so that the drum lever 278 currently aligned with the slide bar is not actuated. As a result, the pick-up bar 260 on the drum, currently adjacent the stack 246 of sheets 43F, remains in its retracted position.

When the trip 308 is depressed to its solid line position by a record jacket 38, the cam 296 is rotated to its full line position. In this position, the flat side 298 of the cam faces the slide 286 and permits the pawl 294 to drop down into engagement with the left end of the slide bar 282 during right-hand movement of the slide from its left-hand, phantom line limiting position. The slide bar is then carried to the right with the slide to actuate the drum lever 278 currently aligned with the bar and extend the respective pick-up bar 260 on the drum, as already discussed.

The suction cups 274 on each pick-up bar 260 are evacuated simultaneously with extension of the bar in the manner just described. The way in which this is accomplished is as follows:

Mounted on the frame 30 of the machine at the forward end of the drum 156, as the latter is viewed in FIG. 9, is a slide valve 312. This valve has a stationary part or housing 314 attached to the frame and a movable slide part 316. The slide 316 moves along a surface 318 on the housing and is held against this surface by a spring loaded bearing plate 320 on the housing.

Housing 314 has a passage 322 and a passage 324 opening through its bearing surface 318. Slide valve 316 has a recess 326 which, in the position of the slide valve shown in FIG. 9, communicates housing passages 322 and 324. Movement of the slide valve 316 to the left from its solid line position to its phantom line position closes off passage 322 in the valve body.

Slide valve 316 is shifted to its right hand, full line open position each time a pick-up bar 260 on the drum is extended toward the stack 246 of sheets 43F in the manner described earlier. The valve is shifted in this way by an arm 328 keyed on each shaft 276 on the drum at the near side of the drum as it is viewed in FIG. 9. Each arm 328 has an outer, inturned end 330 which is aligned with a bent bearing plate 332 on the left-hand end of the slide valve 316 in that stationary position of the drum wherein the pick-up bar 260 adjacent the respective arm is opposite the stack 246. In each stationary position of the drum, then, clockwise rocking of an arm 278 on the drum from its normal phantom line position of FIG. 9 to its dotted line position, by right-hand movement of slide bar 282, to extend the adjacent pick-up bar 260 toward the top sheet 43F on the stack 246, rotates the adjacent shaft 276 and swings the arm 328 keyed thereto from its phantom line normal position to its solid line position. During this clockwise swinging of the arm 328, its inturned end 330 engages the valve slide bearing plate 332 and shifts the valve slide 316 from its phantom line closed position to its full line open position.

Pivoted at its upper end to frame 30, at a point 334 over the slide valve 312, is a valve slide return arm 336. This arm is offset to one side of the slide valve and has a laterally projecting finger 338 engageable with the right-hand end of the valve slide 316.

Keyed on the intermittent gear shaft 218, in the plane of the valve slide return arm 336, is a cam 340. A cam follower roller 342 on the lower end of this arm rides on the cam 340. As will be presently described, the arm 336 is swung from its full line position to its phantom line position by the cam 340, to return the valve slide 316 to its phantom line closed position, after rotation of the applicator drum 156 from either of its stationary positions to a position wherein the pick-up bar 260 then rotating away from the stack 246 of sheets 43F reaches a position opposite the drum pressure roller 158.

Leading from passage 322 in the body 314 of slide valve 312 is a hose 344 which extends to a vacuum pump 346 (FIG. 2A) driven by a separate motor 348 on a table 350 under the left-hand end of the frame 30. Leading from passage 324 in the valve body is a hose 352. This hose extends to a passage 354 in a stationary valve plate 356 opposite the near end of the drum 156, as the latter is viewed in FIG. 9. The shaft 256 of the drum extends loosely through the valve plate, as shown.

Acting between a member 358 rigid on frame 30 and the valve plate 356 are springs 360 (only one shown) which urge the valve plate flat against a second valve plate 362 fixed on the adjacent end of the drum. As may be best observed in FIG. 11, drum valve plate 362 has two generally semicircular grooves 364 which open toward the stationary valve plate 356. Extending through the drum valve plate 362 and opening to the grooves 364, respectively, are two passages 366 from which extend hoses 368, respectively. One hose 368 leads to one pick-up bar 260 and the other hose 368 leads to the other pick-up bar 260, as shown best in FIG. 10. Each pick-up bar has a passage 370 to which the adjacent hose 368 connects and which, in turn, communicates with the several suction cups 274 on the respective pick-up bar.

The grooves 364 in the drum valve plate 362 and the hose passage 354 in the stationary valve plate are arranged so that in each stationary position of the drum 156, an air passage is complete from the suction cups in the pick-up bar 260 opposite the stack 246 of sheets 43F, through the respective hose 368, a valve plate groove 364, and hose 352 to the slide valve passage 324. Also, the length of the valve plate grooves 364 is such that this air passage remains uninterrupted during rotation of the drum from the respective stationary position to a position where the latter pick-up bar 260 is opposite the drum pressure roller 158. Accordingly, when the slide valve 312 is open, with the vacuum pump 346 operating, the suction cups 274 on the latter pick-up bar 260 will be evacuated during the interval just mentioned.

The parts of the machine thus far discussed are driven in synchronism to effect the following sequence of actions. The applicator drum 156 will be approaching one of its stationary positions, such as that shown in FIG. 9, when the leading edge of a record jacket 38, feeding from the hopper 34 to the infeed chain conveyor 118, depresses the trip 308 to rotate trip cam 296 to its solid line, inactive position. Shortly thereafter, and while the advancing jacket 38 is holding the trip 308 depressed, the drum comes to rest in its stationary position and the slide cam 290 commences the right-hand stroke of its slide 286. Since the trip cam 296 is in its inactive position, the pivoted pawl 294 on the slide can swing down to catch the left-hand end of the slide bar 282 so that the latter is carried to the right with the slide.

During the right-hand travel of the slide bar 282, it engages the currently aligned lever 278 on the applicator drum and swings that lever in the clockwise direction from its phantom line normal position to its dotted line position. This action extends the pick-up bar 260 currently opposite the stack 246 of sheets 43F toward the upper edge of the top sheet in the stack. The adjacent valve operating arm 328 on the drum is simultaneously swung to the right from its phantom line normal position to its solid line position during which the arm opens the slide valve 312.

Opening of the slide valve effects evacuation of the suction cups 274 in the extending pick-up bar with the result that the upper edge of the top sheet 43F in the stack 246 is sucked against and adheres to the extended pick-up bar, as shown in FIG. 14.

Immediately thereafter, the slide cam 290 commences the left-hand stroke of its slide 286, thereby permitting left-hand, return movement of the slide bar 282 under the action of its return spring 284. Left-hand movement of the slide bar to its phantom line normal retracted position of FIG. 9 releases the adjacent pick-up bar extension lever 278 on the drum to permit retraction of the currently extended pick-up bar under the action of its return springs 272. The top sheet 43F in the stack 246, of course, adheres to the pick-up bar as the latter retracts.

Immediately after retraction of the extended pick-up bar 260, the intermittent drive gears 222, 224 for the drum re-engage to rotate the drum through its next half revolution. Slide valve closing cam 340, however, has not yet rotated around to its phantom line position, to swing the valve closing lever 336 from its solid line position to its phantom line position to close the slide valve. Accordingly, the suction cups in the just retracted pick-up bar remain evacuated and the top sheet of the stack 246 continues to adhere to bar 260 as the latter rotates with the drum. The top sheet is thereby slid from the stack and carried around with the drum as it rotates through the first part of its next half revolution.

During its travel with the drum, the top sheet is carried past the glue applicator 248, soon to be described, and into the path of an adjacent advancing record jacket. Upon the evacuated pick-up bar rotating to a position opposite the drum pressure roller 158, wherein the leading edge of the now adhesively coated sheet is in the path of movement of the advancing jacket, slide valve closing cam 340 rotates to its phantom line position and thereby closes the slide valve 312 to discontinue evacuation of the currently evacuated suction cups. This releases the adhesively coated sheet from its pick-up bar, the sheet thereafter being "rolled" onto the underside of a record jacket 38 as the latter feeds past the drum, in the manner to be shortly more fully described.

When the drum comes to rest in its next half revolution position, of course, the other pick-up bar 260 on the drum will be disposed opposite the stack of sheets 43F. The above cycle is then repeated during which the next sheet is picked up from the stack, carried around with the drum past the glue applicator means 248, and then released from the drum upon the leading edge of the sheet reaching the path of movement of the next record jacket then advancing past the drum.

Thus, a sheet 43F is removed from the stack 246 and carried past the glue applicator means into the path of the advancing record jackets during each intermittent half revolution of the drum 156. However, if a record jacket is not advancing toward the applicator drum to receive the next cover sheet, the trip 308 remains in its upright untripped position and the trip cam 296 occupies its phantom line active position in which it prevents right-hand movement of the slide bar 282 with the slide 286, as already discussed. In this event, pick-up bar 260 currently opposite the stack of sheets 43F is neither retracted nor evacuated so that the top sheet in the stack is not picked up by the drum. The drum, therefore, continues to undergo its intermittent half revolutions without picking up sheets from the stack until the trip 308 is again depressed by an advancing record jacket. In this way, feeding of adhesively coated sheets 43F through the machine by themselves, and, therefore, contamination of the machine parts by the adhesive on the sheets, is avoided.

The rack means 250 on which the stack 246 of sheets 43F is supported comprises a main, open, rectangular frame structure 372 (FIGS. 2A, 12 and 13) which is rigidly attached to the main machine frame 30 and disposed at an angle to the horizontal, as shown. The side members 374 on this frame comprise flat rails which slidably support a carriage 376 for movement toward and away from the drum 156, as indicated by the arrows in FIG. 2A. This carriage is composed of a guide shoe 378 which fits in between the rails 374 and has guideways 380 in its opposite sides that slidably receive the rails, whereby the carriage can slide along the rails. Rigidly fixed to this guide shoe is a base plate 382. This base plate extends normal to the rack frame 372 and supports the bottom of the stack of sheets 43F, as shown best in FIG. 2A.

Extending parallel to and spaced above the rails 374 are a pair of bars 384. The adjacent ends of these bars are connected by crossbars 386. Extending between the cross bars 386, between and parallel to the bars 384, are a pair of additional bars 388 which are attached at their ends to the cross bars, as shown. These several bars form a platform, generally denoted by the numeral 390 in FIG. 2A, on which the lower edge of the stack of sheets 43F is slidably supported.

Platform 390 is supported on the rack frame 372 as follows: Journaled in the four corners of the frame are four shafts 392 which extend normal to and above the frame. These shafts are restrained against axial movement in the frame and have their upper ends threaded and received in threaded holes in small plates 394 which are rigidly attached to the four corners of the platform 390, in the manner best shown in FIG. 13. When the shafts 392 are rotated, therefore, the platform 390 is raised or lowered, depending on the direction of rotation of the shafts.

Keyed on the lower end of each shaft 392, below the rack frame 372, is a sprocket 396. One shaft also has a knurled handle 398 rigid thereon below its sprocket 396. Trained about these sprockets is a sprocket chain 400. Sprocket chain 400 is also trained about three stationary idler sprockets 402, 404 and 406 rotatably supported on the rack frame 372 and an adjustable idler sprocket 408. This adjustable sprocket is rotatably supported on a slotted plate 410 which is adjustably secured to the underside of one rail 374 by screws and nuts 412. Thus, the plate 410 may be adjusted in the direction of the arrows in FIG. 12.

From this discussion, it is evident that the four platform adjusting shafts 392 may be simultaneously rotated to raise or lower the platform 390, and, thereby, also the stack of sheets 43F supported thereon, by turning the knurled handle 398. The platform is adjusted in this way to locate the upper edge of the top sheet on the stack in the proper position with respect to the applicator drum 156 so that the sheets will be picked up by the pickup bars on the drum in the manner described earlier and each sheet will be properly positioned on the drum to line up correctly with the record jacket to which it is applied. This platform adjustment, of course, also permits compensation to be made for a stack of sheets of different size.

The adjustment afforded by the adjustable sprocket 408 permits accurate alignment of the top edge of the top sheet in the stack with the axial direction of the drum so that, for example, legends printed on the flaps 48 of the cover sheets 43F will be accurately registered with the edges of the record jackets 38, which is necessary for the reason discussed earlier. Thus, it will be seen that when nuts 412 are loosened and plate 410 is adjusted in one direction or the other, the sprocket chain loop 414 between sprockets 396, 402 and 404 and the sprocket chain loop 416 between sprockets 396, 406 and 408 change in length, one becoming longer and the other shorter. This action rotates the two upper sprockets 396 in FIG. 12 but not the two lower sprockets 396 in that figure. As a consequence, one side of the platform 390 is raised or lowered, depending upon the direction of movement of the sprocket plate 410. Tipping of the platform in this way changes the angle between the plane of the upper edge of the stack 246, and, therefore, the angle of the upper edge of the top sheet in the stack, with respect to the axis of the drum 156. This, of course, will produce a corresponding change in the angular relationship between each sheet and the record jacket to which it is applied so that the sheets may be accurately oriented with respect to the jackets by this sprocket chain adjustment.

During operation of the machine, it is, of course, necessary to advance the stack 246 of sheets 43F toward the applicator drum 156 as the sheets are withdrawn from the stack. This is accomplished as follows:

Rotatably supported on a cross member 418 and a cross member 420 of the rack frame 372 are a pair of large sprockets 422 around which a sprocket chain 424 is trained. Guide shoe 378 of carriage 376 has a lock bar 426 on its underside which is slidably guided in a block 428 fixed to the underside of the shoe. One end of this block is slotted at 430 to receive the sprocket chain 424, which extends through the slot 430 in the manner best shown in FIG. 12.

Lock bar 426 has one end formed and slotted to engage between rollers of the sprocket chain 424, as shown at 432, whereby to lock the carriage 376 to the sprocket chain for movement of the carriage by movement of the chain. The other end of the lock bar has a handle 434 by which the bar may be pulled to release it, and, therefore, also carriage 376, from the chain 424. A leaf spring 436 fixed at one end to the lock bar handle 434 and engaging an adjustable stop 438 at its other end restrains the lock bar in its locking position. Stop 438 is fixed to carriage 376.

From this description, it is evident that the carriage may be locked to the chain 424 for movement along the rails 374 by movement of the chain or may be released from the chain for free movement along the rails by simply engaging the lock bar 426 with or disengaging it from the chain.

Sprocket chain 424 is moved to feed the carriage 376, when the lock bar is engaged, as follows:

Keyed to the shaft 440 of the right-hand sprocket 422 in FIG. 12 is a worm gear 442 which meshes with a worm 444 rigid on a shaft 446. This shaft is rotatably supported on the right-hand end of the rack frame 372 above the rails 374 and platform 390 by means of bearings 447 (only one shown) on the frame. Also keyed on the worm shaft 446 is a ratchet wheel 448 between which and the worm 444 is the hub 450 of a cam follower arm 452. Hub 450 is freely rotatable on the worm shaft so that the cam follower arm can pivot on the worm shaft without turning the latter. A spring loaded pin 451 within the bearing 447 bears against the shaft to impose a light friction drag thereon to restrain the shaft against turning.

Cam follower arm 452 has a cam follower roller 454 at its end which rides on the cam 200 keyed to the clutch shaft 180 in FIG. 3, as discussed earlier. A spring 456 acting between the frame 30 and arm 452 urges the cam follower roller 454 against its cam 200. The cam follower arm mounts a spring loaded pawl 458 which engages the ratchet wheel 448 in such a way that the wheel is rotated by clockwise swinging of the arm. Extending from the hub 450 on the cam follower arm 452 is an arm 460 which carries a rod 462 terminating in a pressure foot 464.

During rotation of the cam 200, the cam follower arm 452 is oscillated to oscillate the pressure foot 464 toward and away from the stack 246 of sheets 43F supported on the back plate 382 of the rack carriage 376. The pressure foot is rocked in the clockwise direction in FIG. 13, away from the stack 246, of course, by the positive action of cam 200 and cam follower roller 454 and is rocked in the counterclockwise direction toward the stack by the cam follower spring 456. Accordingly, counterclockwise rocking of the cam follower arm 452 and pressure foot 464 thereon is limited by engagement of the pressure foot with the top sheet of the stack 246.

During each counterclockwise swing of the cam follower arm 452 and pressure foot 464 toward the stack, the spring loaded pawl 458 on the arm moves along the toothed periphery of the ratchet wheel 448, which is held stationary as already noted, in a direction to engage behind a following tooth of the wheel. The pressure foot 464 is so located with respect to the applicator drum 156 that when the top sheet in the stack 246 of sheets 43F supported on the rack carriage 376 is positioned at the correct distance from the drum, counterclockwise swinging of the pressure foot is stopped by engagement of the foot with the top sheet of the stack before the pawl 458 on the cam follower arm 452 can move a sufficient distance along the periphery of the ratchet wheel 448 to engage behind a following tooth on the wheel. Accordingly, during the clockwise swing of the cam follower arm 452, the pawl 458 does not impart rotation to the ratchet wheel and the worm 444 drivably connected thereto. As the machine continues to operate, however, sheets 43F are withdrawn from the stack 246 in the manner described earlier so that the pressure foot 464 rotates a slightly greater distance on each successive counterclockwise swing toward the stack. Pawl 458, therefore, moves a slightly greater distance along the periphery of the ratchet wheel on each of said counterclockwise swings.

The circumferential spacing between adjacent teeth on the ratchet wheel is made such that after a certain number of sheets 43F have been withdrawn from the stack 246, say ten or twelve sheets, pawl 458 engages behind the following tooth on the ratchet wheel. During the next clockwise swing of the cam follower arm 452, by its cam 200, the pawl 458 drives the ratchet wheel and thereby also the worm 444 through a small angle of rotation. Thus rotation of the worm drives the carriage advance sprocket chain 424 on the rack 250, through the worm gear 442, to advance the carriage 376 and stack of sheets 43F supported thereon, toward the drum 156 to compensate for the sheets which were withdrawn from the stack by the drum. The carriage then remains stationary until the next ten or twelve sheets have been withdrawn from the stack, whereupon the above cycle of events is repeated to again advance the carriage and stack 246 thereon a slight distance toward the drum. The worm shaft 446 mounts a handle 466 by which the shaft may be turned by hand when desired.

From the foregoing discussion, it is evident that the rack carriage 376 is intermittently advanced a slight distance toward the drum 156 to compensate for the sheets 43F withdrawn from the stack 246 and thereby maintain the top sheet of the stack at the correct distance from the drum. At any time, the carriage may be released from its drive chain 424 and moved freely along its rails 374 by disengaging the carriage lock bar 426 from the chain 424.

In order to prevent two sheets 43F from being picked up from the stack 246 at one time by the applicator drum 156, the invention provides means for directing air between the top sheet and the next sheet as the top sheet is picked up by the drum to separate these sheets. The way in which this is accomplished will now be described by reference to FIGS. 2A, 3 and 4.

Rotatably supported on the rack frame 372 adjacent and extending over the lower edge of the top sheet 43F of stack 246 is a shaft 462. Keyed on this shaft in line with the approximate center of the top sheet is a suction foot 464 which rocks toward and away from the top sheet, as indicated by the arrows in FIG. 4, when the shaft 462 is oscillated. This foot has a suction cup 466 which is connected, via a hose 468, to a slide valve 470 attached to the machine frame 30. Extending from this valve to a second vacuum pump 471 on frame table 350 is a hose 472. Keyed on the shaft 462, in front of the stack 246 of sheets 43F, is an arm 473 by which the suction foot is rocked, as will be presently described. Pump 471 is driven by motor 348.

In the right-hand limit position of the valve shown in FIG. 4, the valve is closed. The valve is opened, to communicate the suction cup 466 in suction foot 464 with the vacuum pump 471 and thereby evacuate the suction foot, by downward movement of the valve slide 474, as the valve is viewed in FIG. 4.

Valve slide 474 and suction foot 464 are both operated by cam 204 on the clutch shaft 180. Thus, engaging the cam is a cam follower roller 476 on a cam follower arm 478 which is keyed on a shaft 480. This shaft is rotatably supported on the frame 30 of the machine and extends to the near side of the machine, as it is viewed in FIG. 2A. Keyed on the near end of the shaft 480, approximately in the plane of arm 473 on the suction foot shaft 462, is an arm 482 which is pivotally connected at its outer end to a bar 484.

Bar 484 extends downwardly past the outer end of arm 473 and is formed with a slot 486 through which extends a pin 488 on the end of arm 473. Connected between this pin and a part of the rack frame 372 is a spring 490 which urges the suction foot 464 toward the upper sheet of stack 246 and the cam roller 476 against its cam 204.

Also keyed on the shaft 480 is a valve slide operating fork 492. This fork has two arms 494 and 496 which straddle a pin 498 on the valve slide 474. This fork and pin arrangement form a lost motion connection between the fork 492 and valve slide 474.

When the cam 204 is rotating, the pressure foot 464 is obviously oscillated toward and away from the top sheet 43F on stack 246 and the valve operating fork 492 is oscillated between the clockwise limiting position shown in FIG. 4 and a counterclockwise limiting position wherein the fork arm 494 has engaged the valve slide pin 498 and carried the valve slide 474 to its lower open position. These movements of the valve slide and suction foot are timed so that the foot rocks into contact with the upper sheet of stack 246 approximately simultaneously with movement of the valve slide 474 to its open position. This effects evacuation of the suction foot so that when the latter is thereafter rocked away from the stack, the lower edge of the top sheet 43F adheres to the suction foot and is bent away from the next sheet of the stack, as shown in FIG. 4. The valve slide operating fork 492 commences its return swing to its closed position of FIG. 4 at about the same time that the suction foot 464 rocks away from the stack 246. Because of the lost motion connection between the fork and valve slide, however, the valve remains open for an interval of time after the fork has commenced its return swing. This retains the suction foot 464 evacuated during its swing away from the stack so that the rear edge of the upper sheet will be pulled away from the next sheet, as just described.

While the rear edge of the top sheet 43F in the stack is thus lifted by the suction foot 464, blasts of air are directed under the top sheet by two air nozzles 500 and 502 which are mounted on the rack frame 372 opposite the center of the lower edge of the top sheet 43F on the stack. Nozzle 500 has a nozzle opening 504 for directing a blast of air between and parallel to the top sheet and the next sheet and nozzle 502 has a nozzle opening 506 for directing a jet of air toward said next sheet, as shown.

Connected to these nozzles are air hoses 508 and 510, respectively, which lead to a rotary valve 512. This valve comprises a stationary hollow shaft or spindle 514 which is supported on the machine frame 30 and is interiorly communicated to an air compressor 518 driven by a motor 519 (FIG. 2A) via a hose 520. Rotatably mounted on the spindle 514 is a rotary valve member or plate 522 which rotates between two stationary valve members or plates 524 and 526 fixed on the spindle 514. Air hose 508 from nozzle 500 leads to fixed valve plate 526 and air hose 510 from nozzle 502 leads to fixed valve plate 524. The nozzle plates and shaft 514 are ported in such a way that during each rotation of valve plate 522, air is first admitted to nozzle 502 and then to nozzle 500 for a short interval of time and while the rear edge of the top sheet 43F is lifted by suction foot 464 in the manner just described. The valve plate 522 is driven in rotation by a sprocket chain 527 trained about sprocket 198 on the clutch shaft 180 and a sprocket 527a on the valve plate 522. Blasts of air are thereby directed against the rear edge of the second sheet 43F, by nozzle 500, to hold the latter sheet down and then between the latter sheet and top sheet 43F, by nozzle 502, to separate the sheets. The valve ports for nozzle 502 are smaller than those for nozzle 500, as shown in FIG. 3, so that the air from nozzle 502 is at a lower pressure than the air from nozzle 500.

The above operation of the suction foot is timed so that during operation of the machine, the lower edge of the top sheet 43F on the stack 246 is lifted up and air is directed below the top sheet as the upper edge of the top sheet is picked up by a pick-up bar 260 on the applicator drum. In this way, the top sheet is effectively separated from the next sheet so that there is no tendency for the latter sheet to be sucked along from the stack with the top sheet as the latter is carried from the stack by the rotating applicator drum.

Slidably mounted on the supporting structure for the slide valve 470 is a reciprocable stop 528 which is movable between its lower, extended, active position of FIG. 4, wherein the stop is disposed in the path of a cooperating stop arm 530 keyed on shaft 480, and an upper retracted, inactive position, wherein the stop is out of the path of the stop arm 530. In its extended position, the stop 528 limits movement of the valve operating fork 492 to a position short of that in which the valve is opened. This, of course, also limits counterclockwise rotation of shaft 480, under the action of return spring 490, which, in turn, limits clockwise rocking of the pressure foot 464 toward the stack 246 to a position wherein the pressure foot is spaced slightly from the stack. Thus, the suction foot is not evacuated and does not swing into contact with the top sheet of the stack 246 when the valve stop 528 is extended so that the foot does not pick up the lower edge of the top sheet. Under these conditions, the air blast from nozzle 502 holds the top sheet down against the stack.

The stop 528 is extended and retracted by a pivoted lever 532 which is connected to the stop by a yieldable spring connection 533 and to a link 534 that is connected at its other end to the trip arm 304 (FIG. 9) so that when the trip 308 is depressed by a record jacket 38, the stop 528 is retracted to permit normal operation of the suction foot 464 as the top sheets are withdrawn from the stack by the drum 156. Accordingly, if the trip 308 is not depressed by a record jacket, the sheet pick-up bars 260 on the drum 156 are deactivated, as already noted, and the suction foot 464 just described is also deactivated.

FIG. 5 illustrates an auxiliary holddown 536 which is pivoted on the rack frame 372 and engages over the lower edge of the top sheet 43F on the stack 246. This holddown is raised, simultaneously with raising of the suction foot 464 to lift the lower edge of the top sheet 43F, by a cam follower and link means 538 operated from the cam 202 on clutch shaft 180.

As noted earlier, the sheets 43F withdrawn from the stack 246 by applicator drum 156 are carried past a glue applicator means 248. This means will now be described by reference to FIGS. 2A and 14–16.

Glue applicator means 248 comprises a frame 542 which is rotatably supported on a shaft 544. This shaft is attached at its ends to the frame 30 of the machine. Frame 542 can, therefore, oscillate, in the directions indicated by the arrows in FIG. 14, toward and away from the applicator drum 156. On the frame 542 is a cam follower roller 546 which rides on a cam surface 548 on the edge of the plate at the far side of drum gear 224 having the recesses 228 and 230 to receive the locking segment 226 of the drum intermittent drive gear 222. Engagement of roller 546 with each of two diametrically opposed high points 548a of the cam surface 548 holds the frame away from the drum. Following each high point is a low point 548b of the cam surface which permits the frame 542 to swing toward the drum 156.

Frame 542 comprises two parallel end plates 550 between which are located a pair of glue applicator rollers 552 and 554. The ends of these rollers are rotatably supported in bearing blocks 556 which are slidably supported in the end plates 550 for adjustment, in the direction indicated by the arrows in FIG. 15, to vary the spacing between the rollers and the positions of the rollers with respect to the applicator drum 156. The bearing blocks 556 are adjusted in this way and locked in adjusted position by means of adjusting screws 558.

Rollers 552 and 554 are peripherally grooved in the manner of conventional glue applicator rollers and are adjusted to provide a slight spacing between the rollers as well as to effect the proper contact of the glue roller 554 with the adjacent side of a sheet 43F as the latter is carried past the glue applicator means and the glue roller frame 542 is in its extended position close to the applicator drum 156.

Mounted on the main frame 30 of the machine is a nozzle 560 which delivers glue or adhesive 562 between the rollers, as shown in FIG. 14. Nozzle 560 is connected to a glue container 564 (FIG. 2A) through a pump 566 driven via a sprocket chain 567 directly from a sprocket on the output shaft of gear reducer 168. The glue pipes have been omitted for clarity.

Carried on the glue roller frame 542 below the glue rollers is a pan 570 which catches the glue draining from the rollers and conveys the glue to a receptacle 572 from whence it drains back to the glue container 564. Accordingly, so long as the the main drive motor 164 is operating, the glue is constantly recirculated from the tank 564, through the glue rollers, and back to the tank.

The glue rollers 552 are driven through a sprocket chain 574 (FIG. 2A) which is trained about the clutch sprocket 190 in FIG. 3 and a sprocket 576 rotatably supported on frame 30. On the shaft of this latter sprocket is a second sprocket around which sprocket and a sprocket 578 rotatably supported on the glue roller frame 542 is a sprocket chain 580. Rigid with sprocket 578 is a gear 582 meshing with a gear 584 on the shaft of glue roller 554. This latter gear meshes with a gear 586 on the glue roller 552. Both glue rollers, therefore, are driven from the clutch sprocket 190, so long as the main drive motor 164 is operating, even though the clutch 178 is disengaged.

This constant recirculation of the glue and rotation of the glue rollers, even while the other parts of the machine are stationary, is necessary in order to effect constant agitation of the glue so as to prevent its setting.

During operation of the machine, the glue roller frame 542 is caused to oscillate toward and away from the applicator drum 156, by the cam roller 546 riding on the drum cam surface 548. This oscillation is so timed that the frame moves toward the drum at just the right instant to engage the glue roller 554 with the leading edge of each sheet 43F as the latter is carried by the glue applicator means by the drum, and moves away from the drum when the trailing lower end of the respective sheet becomes aligned with the roller 554. In this way, adhesive is applied to the outer surface of each sheet 43F but not to the surface of the drum 156. The length of each sheet 43F is somewhat less than one half the circumference of the drum so that the trailing edge of one sheet becomes aligned with the glue roller 554 and the latter is retracted away from the drum at about the same time that the drum comes to rest in its following stationary position to pick up the next sheet 43F from the stack 246.

In order to avoid contact of glue roller 554 with the surface of the applicator drum 156 in the event of failure of a pick-up bar 260 to pick up a sheet 43F from the stack 246, the glue roller frame 542 is held in its retracted position away from the drum unless a sheet 43F is advancing toward the glue rollers on the drum. This is accomplished as follows:

Rigidly attached to and depending from the near frame member 64 in FIG. 2A is a support arm 590 which, as shown best in FIG. 15, mounts a pair of adjustable stop screws 592 and 594 at its lower end. Pivotally mounted on the adjacent side plate 550 of the glue roller frame 542 is a generally L-shaped stop lever 596. One arm 598 of this lever is swingable between the extended position shown, wherein its end is aligned with stop screw 592, and a retracted position, wherein the end of the stop is aligned with the stop screw 594. While the cam roller 546 on the glue roller frame 542 contacts a high point 548a of the drum cam surface 548, a slight clearance exists between the stop arm 598 and the stop screw 592, as shown in FIG. 15. Rotatably supported in the end plates 550 of the glue roller frame is a shaft 600 on which is rotatably fitted a sleeve 601. Connected between this sleeve and the other arm 602 of stop lever 596 is a spring wire 604 which urges the lever to its retracted position of alignment with stop screw 594. A stop finger 605 on the sleeve 601 normally engages the lever arm 602, however, to retain the stop lever in its extended position shown. Keyed on the shaft 600 is a thin trip finger 606 which is engageable in diametrically opposed circumferential clearance grooves 608 in the surface of drum 156 and in the pick-up bars 260.

During rotation of the drum, the finger 606 occupies its position of FIG. 15, wherein it extends into the drum grooves 608, as the drum rotates, unless a sheet 43F adheres to the drum. In this event, the leading edge of the sheet cams the trip finger 606 out of the adjacent drum groove 608, thereby imparting counterclockwise rotation to shaft 600.

Stop finger 605 is rigid on the sleeve 601 which is rotatable on the shaft 600, as already noted, and is connected to the latter by a coil spring 612 and pin 614 which extend through a circumferential slot 616 in the sleeve 601.

The parts are arranged so that when a sheet 43F is being properly carried toward the glue rollers by the drum 156, the leading edge of the sheet reaches the trip finger 606 while the cam roller 546 on the glue roller frame 542 is still on the adjacent high point 548a of the drum cam surface 548 so that the stop arm is spaced slightly from the stop screw 592. The sheet 43F then cams the trip finger out of the adjacent drum groove 608 to rotate the shaft 600 in the counterclockwise direction, as just mentioned. Rotation of shaft 600 rotates the sleeve 601, and thereby the stop finger 605, to disengage the stop finger from the pivoted stop lever 596, whereby the latter pivots to its retracted position under the action of spring wire 604.

Shortly after the stop 596 is retracted in this way, the cam roller 546 on the glue roller frame 542 rides onto a low point 548b of the drum cam surface 548 thereby permitting the glue roller frame to swing to its extended position toward the drum 156 for applying adhesive to the advancing sheet, as already discussed. Swinging of the glue roller frame toward the drum is limited by contact of the stop arm 598 with stop screw 594. This stop screw is adjusted to obtain the proper clearance between the drum and glue roller 554 in the extended position of the glue roller frame.

In the event of failure of a pick-up bar 260 on the drum to pick up a sheet 43F, the trip finger 606 remains untripped during the following rotation of the drum through its half revolution. Accordingly, the stop 596 still occupies its extended position of FIG. 15 when the cam roller 546 on the glue roller frame rides onto the low point 548b of the drum cam 548. Swinging of the glue roller frame toward the drum is then limited by contact of the stop arm 598 with stop screw 592. This stop screw is adjusted to hold the glue roller 554 a sufficient distance from the drum to eliminate the possibility of glue on the roller contacting the drum. Eventually, of course, the trip finger 606 reaches the end of the adjacent drum groove 608 and is cammed onto the surface of the drum behind the groove. By this time, however, the weight of the glue roller frame is pressing the stop arm 598 against the stop screw 592 which keeps the stop lever 596 from pivoting to its retracted position. In this event, the spring wire 604 merely flexes to permit the shaft 600 and parts thereon to rotate with the trip finger 605, while the stop lever 596 remains stationary.

The spring connection 612 between the shaft 600 and sleeve 601 permits the trip finger to rotate in a clockwise direction, against the action of the spring 612, without causing damage to the other parts of the glue roller frame stop means, as is necessary when the drum 156 is rotated in the reverse direction. This reverse direction of drum rotation may be necessary at times to cure a mal-functioning of the machine.

From this description, it is evident that the glue roll frame 542 oscillates toward and away from the applicator drum 156, to apply adhesive to the outer surface of each sheet 43F picked up by the drum from the stack 246, as each sheet is advanced from the stack into the path of an advancing record jacket 38.

This completes the structural description of the first applicator mechanism 40 which is composed of the several mechanisms described above.

From this description, we have seen that the applicator drum 156 is driven in intermittent rotation through half revolutions and peroidically comes to rest in its half revolution position wherein one or the other of the pick-up bars 260 on the drum are disposed adjacent the top edge of the top sheet 43F on the stack 246. In each position, the adjacent pick-up bar is extended and evacuated and then retracted to pick up the top edge of the top sheet. Simultaneously, the lower edge of the top sheet is lifted by the suction foot 464 and blasts of air are directed between the top sheet and next sheet by nozzles 500 and 502 to separate these sheets. Immediately thereafter, the drum is rotated through its next half revolution to remove the top sheet from the stack and advance the sheet past the glue applicator means 248, where adhesive is applied to the outer surface of the sheet, into the path of an advancing record jacket 38.

If a record jacket is not advancing to pick up a sheet from the applicator mechanism 40, the trip 308 remains undepressed and the pick-up bars 260 on the drum are not extended or evacuated. Failure of the drum to pick up a sheet 43F deactivates the glue applicator means 248 and retains the glue roller 554 out of contact with the drum.

The carriage 376 on the rack is intermittently advanced toward the drum 156 as sheets are removed from the stack 246 supported on the carriage so as to constantly retain the top sheet of the stack at the proper distance from the drum.

We proceed now to the remainder of the machine.

As already discussed, the intermittent rotation of the drum 156 is synchronized with feeding of record jackets 38 past the drum in such a way that each adhesively coated sheet 43F delivered by the drum into the path of movement of the jackets meets and is rolled onto the underside of a jacket as it moves past the drum. Evacuation of the suction cups on the pick-up bar holding the leading end of each sheet is cut off just as the leading end of the sheet contacts the jacket so that the adhesive side of the sheet adheres to the jacket. Also, the flaps 48 on each sheet 43F extend beyond the side and bottom edges of its respective jacket in readiness to be folded about these edges.

At the end of each half revolution of the drum 156, which brings a pick-up bar 260 in a position to be extended to pick up a sheet 43F from the stack 246, the leading edge of that record jacket 38 which has just received an adhesive sheet from the drum is located a short distance beyond a small pressure roller 618 on the frame 30, as shown in FIG. 14. Just beyond this roller is an opening 620 through which move a pair of pressure rollers 622 and 624.

Pressure rollers 622 and 624 are carried on a pair of arms 626 (FIG. 1A) which are hinged to and depend below a pair of curved arms 628. Arms 628 are keyed to a shaft 630 extending across and rotatably supported on frame 30. Keyed to this shaft adjacent the near end of drum 156, as the latter is viewed in FIG. 14, is an arm 632 to the outer end of which is pivoted a link 634. The lower end of link 634 is pivoted to the end of a cam follower arm 636, itself pivoted on the frame 30 at 637.

Follower arm 636 has a roller 638 which rides on a cam 640 keyed on the intermittent gear drive shaft 218.

Pressure rollers 622 and 624 are vertically movable, by the cam 640, between a lower position wherein the upper roller 622 is below the path of movement of the record jackets 38 and the upper position of FIG. 14. Cam 640 is oriented on the shaft 218 so that each time a record jacket comes to rest in the position of FIG. 14, at the end of a half revolution of the drum 156, the pressure rollers 622, 624 are lowered and are then immediately elevated to the position of FIG. 14. During this elevation of the rollers, the upper roller 622 folds up the end flap 48 of the sheet 43F applied to the jacket, as shown. The cam 640 retains the rollers in this elevated position until after commencement of the next half revolution of the drum 156 during which the jacket 38 above the drum is advanced through the pressure rollers 622, 624 to a position between pressure roller 214 and its cooperating pressure roller 642. During passage of the jacket between the elevated pressure rollers 622, 624, the then upwardly folded end flap 48 is folded back against the reverse or upper side of the jacket. Upon emerging from rollers 622, 624, therefore, the jacket appears as shown in the second stage of FIG. 22. Roller 214, which is driven in the manner described earlier, drives the upper roller 642 through gearing 644 to feed the jacket 38 to the right wherein the trailing end of the jacket clears the flap folding rollers 622, 624. These latter rollers are then immediately lowered by their cam 640 in readiness for the next record jacket 38 which is then advancing past and receiving an adhesively coated sheet 43F from the applicator drum 156.

Beyond pressure rollers 214, 642 are another set of pressure rollers 646 and 648 interconnected by gearing 650 and driven from pressure roller 214 by means of a sprocket chain 652. These latter pressure rollers receive each record jacket, with its applied adhesive sheet 43F, from the previous pressure rollers and advance the jacket through a pair of flap folding shoes 654 to another set of pressure rollers 656 and 658.

Flap folding shoes 654 comprise flat bars which are bent from an L section at their left ends to an inwardly opening U section at their right ends, in the well-known way, so as to fold the side flaps 48 on the sheet 43F applied to each record jacket 38 about the side edges and against the reverse or upper side of the jacket as the latter moves through the folding shoes. Upon emerging from the folding shoes 654, therefore, the jacket appears as shown in the third step of FIG. 22. Between the pressure rollers 646, 648 and 656, 658 are two holddowns 662 and a rail 664 which, respectively, hold the jackets down and slidably support the jackets during their movement through the folding shoes 654, rail 664 extending beyond the pressure rollers 656, 658, as shown. Pressure rollers 642 and 646 are rotatably supported on the frame by spring loaded bearings 665 of the type described earlier.

As shown best in FIG. 1A, the upper pressure rollers 656 are quite narrow and mounted on shafts 666. These shafts are rotatably supported at one end of the side frame members 64 by spring loaded bearings 668 identical to those described earlier and at their other ends on a cross frame member 670 by bearings 672. The axes of the rollers at the two sides of the frame are inclined, as shown. The lower pressure rollers 658 are also narrow but have their axes normal to the length of the frame. The upper and lower rollers 656, 658 are connected by gearing 674 and are driven from the previous lower pressure roller 648 by a sprocket chain 676.

Behind or to the right of the pressure rollers 656, 658 are a series of narrow, freely rotatable pressure rollers 678, 680. Rollers 680 have their axes parallel to the lower roller 658 while rollers 678 have their axes inclined and parallel to the axes of rollers 656, respectively. These several inclined pressure rollers are arranged to bear on the upper sides of the side flaps 48 of the sheets 43F applied to the undersides of the record jackets, which side flaps, it will be recalled, have just been folded about the edges and against the upper sides of the jackets by the folding shoes 654. The latter rollers press the folded side flaps into intimate contact with the record jackets and, because of their inclined axes, also produce a continuous inward sliding or rubbing action on the flaps which draws the latter tight about the jacket edges.

After emerging from the inclined rollers 678, the jackets pass between yet another set of pressure rollers 682 and 684 which are connected by gearing 686 and driven from the previous lower rollers 658 by a sprocket chain 688. Rollers 682 are rotatably supported on the frame 30 by spring loaded bearings 690, as before.

The spacing between the several sets of pressure rollers just described is somewhat less than the length of each record jacket. Accordingly, the leading edge of each jacket engages between a following set of rollers before the trailing end of the jacket leaves the previous set so that jackets are continuously fed along the frame 30 by the pressure rollers. These pressure or feed rollers, then, comprise a part of the first conveyor 117 which, in turn, is a part of the conveyor means 44, mentioned earlier.

The last set of pressure rollers 682, 684 delivers the record jackets to an inverter 692 included in the conveyor means 44. This inverter will now be described by reference to FIGS. 1B, 2A, 17 and 18.

The inverter comprises a shaft 694 which extends across and is rigidly attached to the members 64 of frame 30. Rotatable on this shaft is a sleeve 696. Also rotatable on shaft 694, just beyond the upper end of sleeve 696, as the machine is viewed in FIG. 1B, is a radial arm 698. Pivotally connected at one end to the outer end of this arm is a rod 700, the other end of which is pivotally connected to the outer end of a crank arm 702 (FIG. 2A). Crank arm 702 is keyed to a shaft 704 which is rotatably supported on the far frame member 64 in FIG. 2A and mounts a sprocket wheel 706 driven by the sprocket chain 688. During operation of the machine, therefore, the crank arm 702 rotates to reciprocate the rod 700 and thereby oscillate the arm 698 in FIGS. 1B and 17.

Also rotatable on the fixed shaft 694 of the inverter 692 is a wheel 708 consisting of a sleeve 710 rotatable on shaft 694 and having hubs 712 fixed on its ends. Extending radially from these hubs are pairs of fingers 714 which are aligned on the two hubs and spaced 90° apart, as shown, and define slots to receive the record jackets or base members. The upper wheel hub 712 in FIG. 1B is fixed to a hub 715 on sleeve 696.

Rigid on the end of sleeve 696 adjacent the oscillatory arm 698 is a ratchet wheel 718 which is locked to the sleeve 696 by a set screw 720. Ratchet wheel 718 has four ratchet teeth 722 spaced 90° apart engageable by a spring loaded pawl 719 on the arm 698.

Secured to the other end of the wheel sleeve 710 is an indexing disc 724 which is locked to the sleeve by a set screw 726. Disc 724 has four depressions 728 in its periphery, spaced 90° apart, to receive a spring loaded indexing ball 730 carried on a part 732 which is clamped to shaft 694 by a set screw 734.

The arrangement of the inverter 692 is such that during oscillation of arm 698, by crank arm 702 and rod 700, in the manner described earlier, the ratcheting means 718, 719, 722 act to impart 90° of rotation to the wheel 708, in the direction indicated by the arrow in FIG. 17, for each revolution of the crank arm 702. The detent means 728, 730 serve to accurately index the wheel in its 90° position and to hold the wheel against rotation during movement of pawl 717 from one ratchet tooth 722 to the next. The fingers 714 on the wheel are so located as to be disposed in horizontal and vertical planes in the 90° positions of the wheel.

The intermittent, 90° rotation of the wheel is timed so that in each stationary position of the wheel, a record jacket 38 is fed between the then horizontal, left-wardly extending fingers 714 on the wheel by the final pressure or feed rollers 682, 684 of the first conveyor 117. Each record jacket thus received by the wheel 708 is turned through 180° to an inverted position by the following intermittent rotation of the wheel through 180°. In other words, the second conveyor 692 flips each record jacket over to a position wherein the side of the jacket having the previously applied adhesive sheet 43F is uppermost and the bare side of the jacket faces down. This flipover of the jackets is depicted in the third and fourth steps in FIG. 22.

Located at the right-hand side of the wheel 708 is a third conveyor 736 of the conveyor means 44. This third conveyor is composed of a chain conveyor 738 which is identical to the first chain conveyor 118 and feeds the jackets from the wheel 708 to the applicator drum 740 of the second applicator mechanism 42. This applicator mechanism is also identical to the first applicator mechanism 40. In view of this similarity of the chain conveyors and applicator mechanisms, the second chain conveyor 738 and second applicator mechanism will be only briefly discussed at this point.

The left-hand sprockets 742 of the chain conveyor 738 are located close to the axis of the wheel 708 and the movements of the wheel and second chain conveyor are synchronized so that the cleats (not shown) on the chains of the conveyor will engage behind the now thick trailing edge of each record jacket upon rotation of the latter with the wheel to a stationary, horizontal, inverted position at the right side of the wheel. To facilitate this engagement of the chain cleats behind the trailing edge of the inverted record jackets, a pair of curved cam strips 744, fixed to jacket supporting rails 748 on the frame 30 at the right of the wheel 708 and bearing against the sleeve hub 715 and indexing disc 724, are provided to cam each record jacket away from the center of the wheel 708, as the jacket rotates around with the wheel, a sufficient distance to enable the cleats on the chains of chain conveyor 738 to engage behind the jackets and yet clear the wheel.

As mentioned above, the chain conveyor 738 advances the inverted jackets, bare side down, to the drum 740 of the second applicator mechanism 42. This mechanism includes a rack means 752 for holding a stack 754 of the liner sheets 43R, a glue applictor means 756, and the applicator drum 740 which is intermittently driven through half revolutions and periodically picks up the top sheet 43R from the stack 754, carries the sheet past the glue applicator means 756, and delivers the adhesively coated sheet into the path of movement of the advancing, inverted record jackets on the chain conveyor 738 at just the right time to meet an adjacent jacket as it feeds past the drum. The sheet is then "rolled" onto the now bare underside of the jacket, in exactly the same way as described in connection with the first applicator mechanism 40 and depicted in the fourth step of FIG. 2..

The various parts of the second mechanism 42 operate in precisely the same way as the corresponding parts of the first mechanism 40 so that no further discussion of the second mechanism is deemed necessary except to say that shaft 758 of the second mechanism, which corresponds to the clutch shaft 180 of the first mechanism, is driven from the latter shaft by a sprocket chain 760 which is trained about sprocket 196 on the first clutch shaft 180 and a corresponding sprocket on the second shaft 758. Shaft 758, of course, does not mount a clutch as does clutch shaft 180 since the clutch on the latter shaft serves both shaft 180 and shaft 758 which is driven from shaft 180. Also, shaft 758 does not have sprockets corresponding to sprockets 172, 190 or 192 on shaft 180 but it does have cams, an intermittent shaft and chain conveyor drive sprocket, and a valve drive sprocket corresponding to those on shaft 180. These various elements on the second shaft 758 have not been shown since they are identical to those shown and described in connection with mechanism 40.

The blue rolls of the second glue applicator means 756 are driven from the sprocket 192 on the clutch shaft 180 via sprocket chains 762 and 764 in the same manner as described earlier.

The two vacuum pumps 766 and 768 for the second applicator mechanism 42 are driven from the motor 519 mentioned earlier. Compressor 518 delivers air to the sheet separating nozzles (not shown) of the second applicator mechanism through a hose 769.

The second applicator mechanism has its own glue tank 770 through which and the continuously rotating glue rollers of the glue applicator means 756 glue is continuously recirculated by the glue pump 566 mentioned carrier.

The second applicator mechanism 42 is provided with a trip 774 for deactivating the latter mechanism when a record jacket 38 is not advancing to receive a sheet 43R from the drum 740 of the second mechanism in exactly the same way as described earlier with respect to the first mechanism 40.

When the clutch 178 on the clutch shaft 180 is disengaged to stop the operation of the machine, it is desirable to move the glue roller frame 542 of the first glue applicator means 248 and the glue roller frame 776 of the second glue applicator means 756 away from their respective applicator drums 156 and 740 to prevent contamination of the drums by the glue on the continuously rotating glue rollers. This is accomplished by bell crank levers 778 which are hinged on the frame 30 and connected via links 780 to their respective glue roller frames so that rocking of the bell cranks in a clockwise direction swings the frames away from the drums. The bell cranks 778 are rocked in this direction by solenoids 782. These solenoids are energized, to retract the glue roller frames, by closing of a switch 784. This switch is closed, to energize the solenoids and thereby retract the glue roller frames, by the clutch lever 188 when the latter is shifted to disengage the clutch 178.

Located just to the right of the second applicator drum 740 and its pressure roller 786, in a position corresponding to that occupied by the flap folding rollers 622, 624 to the right of the first applicator drum 156, is the trimmer 50 which trims the open leading end of each record jacket after the latter emerges from the second applicator mechanism 42. This trimmer will now be described by reference to FIGS. 1B, 2B, 19 and 20.

The trimmer 50 comprises a frame 788 which is slidably supported on rails 790 on the main frame 30 for adjustment lengthwise of the frame and of the path of movement of the record jackets along the frame. These rails engage in grooves in guide shoes 792 fixed to the trimmer frame. Rotatably supported on the frame, but restrained against axial movement, are a pair of shafts 792 and 794 which are threaded in the trimmer frame 788 so that rotation of these shafts moves the frame in one direction or the other along the path of movement of the record jackets along the frame 30. Shaft 792 is long and mounts a knurled handle 796 by which it may be turned. Shafts 792 and 794 are interconnected by a sprocket chain 798 trained about sprockets 800 on the shafts so that rotation of shaft 792 in either direction rotates shaft 794 in the same direction.

Figure 20:
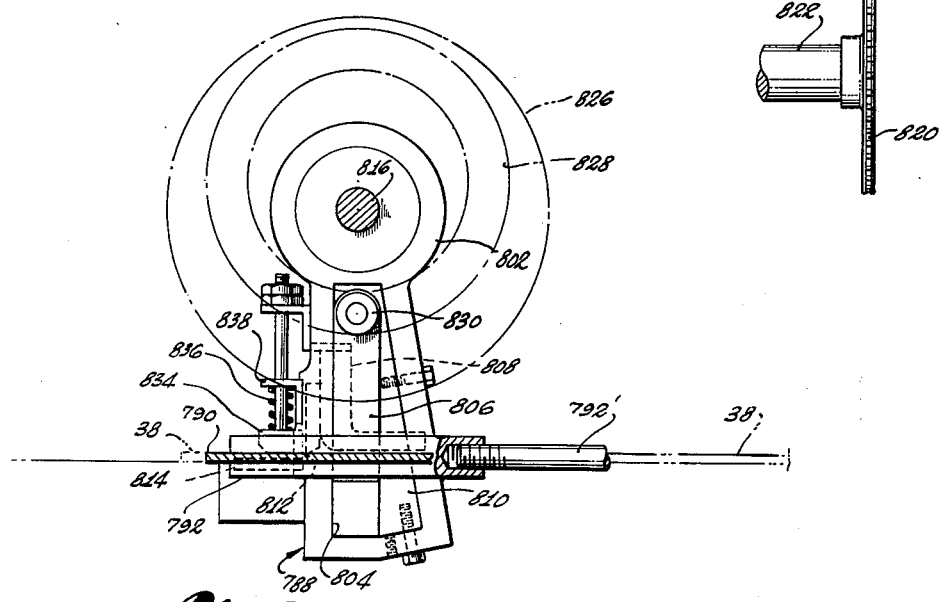
FIG. 20 is a section taken along line 20—20 in FIG. 19.

Trimmer frame 788 includes upstanding side members 802 having vertical guideways 804 in which guide shoes 806 in opposite ends of a horizontal blade holder 808 are slidably fitted. One side of these guideways is defined by wedges 810 which are longitudinally adjustable to provide the proper clearance of the cutter guide shoes 806 in their guideways and compensate for wear of the parts. Holder 808 mounts a tapered shear blade 812 between which and a cooperating shear plate 814 the record jackets 38 move, as shown. When a record jacket is positioned as shown in FIG. 20, its leading edge is sheared by downward movement of the shear blade 812.

Rotatably supported on the end members 802 of the trimmer frame 788 is a shaft 816 mounting a sprocket 818 at one outboard end. Trained about this sprocket and a sprocket 820 on the intermittent drive gear shaft 822 of the second applicator mechanism 42 is a sprocket chain 824 so that trimmer shaft 816 is driven in rotation in synchronism with the other parts of the machine.

Keyed to the trimmer shaft 816, outboard of the trimmer frame members 802, are a pair of cam discs 826 having internal cam grooves 828 (only one shown) which receive cam follower rollers 830 (only one shown) on the cutter guide shoes 806. When the cam discs 826 are driven in rotation, therefore, the trimmer blade 812 is reciprocated up and down. The cam grooves 828 are closed by cover discs 832 fixed to the trimmer frame members 802.

The blade holder 808 mounts a stripper plate 834 which is spring loaded down by springs 836 acting between the plate and a bracket 838 on the trimmer frame 788.

During operation of the machine, which operation is diagrammatically illustrated in FIG. 21, each record jacket 38 advancing from the second applicator mechanism 42 comes to rest, in a stationary half revolution position of the second applicator drum 740, in a position where the open, now leading end of the jacket is located under the trimmer blade 812. The movements of the blade are timed so that the blade descends to trim each jacket after it becomes stationary just beyond the second applicator drum 740 and the blade rises to clear each jacket before it is again advanced by rotation of the second applicator drum through the next half revolution.

Beyond the trimmer 50 are pressure rollers 842, 844, a slow outfeed conveyor belt 846, and final sets of pressure rollers 848, all driven by sprocket chains from a sprocket 850 in the second applicator mechanism 42 in the manner shown in FIG. 2B. The slow outfeed conveyor belt 846 allows a period of time to expire before the jackets, with their applied cover and liner sheets 43F and 43R, pass through the final pressure rollers 848. During this interval, the glue on the sheets sets slightly so that the final pressure rolling by rollers 848 effectively seals the sheets to the jackets.

This then completes the structural description of the machine. The operation of the machine is obvious from the preceding description, and illustrated in FIG. 22.

Thus, the jackets 38 are successively fed from the hopper 34 over and past the applicator drum 156 of the first applicator mechanism 40 during which an adhesively coated sheet 43F is applied to one side of each jacket. During the following movement of the jackets between the first and second applicator mechanisms, the flaps 48 on the sheets 43F are folded about the edges and against the reverse or upper side of the jackets by the flap folding rollers 622, 624 and the folding shoes 654, which together make up the flap folding means 46, the flaps are pressed by the following inclined pressure rollers 656, 658, 678, 680, and the jackets are then flipped over by the inverter 692.

Beyond this inverter, the inverted jackets are fed over and past the applicator drum 740 of the second applicator mechanism 42, during which an adhesively coated sheet 43R is applied to the other side of each jacket. Thereafter, the open ends of the jackets are trimmed by the trimmer 50, the adhesive is given a chance to set slightly on the slow outfeed conveyor 846, and the jackets are given a final pressing by the last pressure rollers 848.

The applicator mechanisms are deactivated whenever jackets are not advancing theretoward and in the event of failure of an applicator drum to pick up a cover or liner sheet.

It is obvious that while the sheets 43F having the flaps 48 were referred to as the "cover" sheets, they could as well be the liner sheets in which case the cover sheets would not have flaps. Also, it is evident that the invention is capable of use for applying adhesive labels other than record jacket cover and liner sheets, as described.

The use of separate vacuum pumps for the pick-up bars 260 and suction foot 464 of each applicator mechanism 40, 42 and for the two mechanisms themselves is desirable since the vacuum can then be adjusted differently in the two mechanisms to suit different weights and kinds of paper.

Numerous modifications in the design, arrangement of parts and instrumentalities of the invention are obviously possible within the spirit and scope of the following claims.

What is claimed is:

1. A machine for applying labels to the sides of flat base members, comprising a frame, first conveyor means on said frame for horizontally feeding said members edgewise in succession along the frame, a first label-applying mechanism on said frame below said conveyor means for applying a label to the underside of each member as it moves past the mechanism, a rotary inverter on said frame having a number of radial base-member-receiving slots, said inverter being rotatable in one direction to rotate said slots successively through a first position, wherein each slot is disposed to receive a labeled base member from said conveyor means, and a second position 180° displaced from said first position, wherein the base member in each slot is inverted and has its unlabeled side lowermost, second conveyor means on said frame following said inverter for extracting the base member from each inverter slot in said second position and horizontally feeding each member edgewise along said frame, a second label-applying mechanism on said frame below said second conveyor means for applying a label to the underside of each member moving past the latter mechanism, and means for synchronously driving said conveyor means and intermittently rotating said inverter in said one direction so that each inverter slot is successively arrested in said first position to receive a base member from said first conveyor means and in said second position to deliver its respective base member to said second conveyor means.

2. A machine for applying labels to the sides of flat base members, comprising a frame, first conveyor means on said frame for horizontally feeding said members edgewise in succession along the frame, a first label-applying mechanism on said frame below said conveyor means for applying a label to the underside of each member as it moves past the mechanism, a rotary inverter on said frame having a number of radial base-member-receiving slots, said inverter being rotatable in one direction to rotate said slots successively through a first position, wherein each slot is disposed to receive a labeled base member from said first conveyor means, and a second position 180° displaced from said first position, wherein the base member in each slot is inverted and has its unlabeled side lowermost, said slots being arranged in pairs of diametrically opposed slots, whereby when one slot of a pair occupies one of said positions, the other slot of the respective pair occupies the other position, second conveyor means on said frame following said inverter for extracting the base member from each inverter slot in said second position and horizontally feeding each base member edgewise along said frame, a second label-applying mechanism on said frame below said second conveyor means for applying a label to the underside of each member moving past the latter mechanism, and means for synchronously driving said conveyor means and intermittently rotating said inverter in said one direction so that each inverter slot is successively arrested in said first position to receive a base member from said first conveyor means and in said second position to deliver its respective base member to said second conveyor means.

3. A machine for applying labels to base members, comprising a frame, conveyor means on said frame for feeding said members in succession along a given path on said frame, a rotary drum on said frame tangent to said path including an axially extending, radially extendible and retractable pick-up bar, suction cups in the outer surface of said bar, a rack on said frame for holding a stack of labels with the uppermost label in the stack positioned to be engaged along one edge by said pick-up bar when the latter is extended with said drum in a predetermined angular position, means for intermittently rotating said drum so that the latter is periodically arrested in said predetermined angular position, means for extending and then retracting said pick-up bar while said drum is stationary in said predetermined angular position, means for evacuating said suction cups when said bar is extended and during subsequent rotation of said bar with the drum to said path, whereby the labels in said stack are successively withdrawn from the stack and carried around with the drum toward said path during continuous intermittent rotation of the drum, said drum having a cylindrical surface following said bar with respect to the direction of rotation of the drum which is flush with said outer surface of the pick-up bar when the latter is retracted, said outer surface of the pick-up bar being cylindrically curved and forming with said cylindrical drum surface a continuous cylindrically curved supporting surface for the label on the drum, an adhesive applicator on said frame for applying adhesive to the outer surface of each label as the latter is carried around with the drum from said stack toward said path, and means for driving said conveyor means in synchronism with intermittent rotation of the drum.

4. A machine for applying labels to base members, comprising a frame, conveyor means on said frame for feeding said members in succession along a given path on said frame, a rotary drum on said frame tangent to said path including an axially extending, radially extendible and retractable pick-up bar, suction cups in the outer surface of said bar, a rack on said frame for holding a stack of labels with the uppermost label in the stack positioned to be engaged along one edge by said pick-up bar when the latter is extended with said drum in a predetermined angular position, means for intermittently rotating said drum so that the latter is periodically arrested in said predetermined angular position, spring means to urge said bar to its retracted position, a pivoted lever on said drum engageable with said bar to extend the latter against the action of said spring means when the lever is rocked in one direction, a reciprocable slide bar on said frame engageable with said lever to rock the latter in said one direction by movement of said slide bar in one direction while said drum is in said predetermined angular position, spring means for urging said slide bar in the opposite direction, a reciprocable slide member on said frame movable parallel to said slide bar, means for reciprocating said slide member in synchronism with intermittent rotation of said drum, a movable pawl on said slide member having an extended position in which the pawl engages said slide bar to move the latter in said one direction thereof during movement of said slide member in one direction, depressible trip means disposed in said path for retaining said pawl in a retracted position, wherein it is disengaged from said slide bar during reciprocation of said slide member, said trip means being depressed by each base member moving along said path to release said pawl for engagement with said slide bar, whereby said pick-up bar is extended and retracted when said drum is in said predetermined angular position only if said trip means is depressed by a base member moving along said frame, means for evacuating said suction cups when said bar is extended and during subsequent rotation of said bar with the drum to said path, whereby the labels in said stack are successively withdrawn from the stack and carried around with the drum toward said path during continuous intermittent rotation of the drum, an adhesive applicator on said frame for applying adhesive to the outer surface of each label as the latter is carried around with the drum from said stack toward said path, and means for driving said conveyor means in synchronism with intermittent rotation of the drum.

5. A machine for applying labels to base members, comprising a frame, conveyor means on said frame for feeding said members in succession along a given path on said frame, a rotary drum on said frame tangent to said path, a rack on said frame for holding a stack of labels with the uppermost label in the stack positioned adjacent said drum, means for rotating said drum, means on said drum for extracting the top label from the stack during each revolution of the drum, whereby the labels in said stack are successively withdrawn from the stack and carried around with the drum toward said path during continuous intermittent rotation of the drum, an adhesive applicator on said frame for applying adhesive to the outer surface of each label as the latter is carried around with the drum from said stack toward said path including an applicator roller movable toward and away from said drum, means for urging the roller toward the drum, cooperating means on said drum and applicator means for moving said roller away from the drum and releasing the roller for movement toward the drum in synchronism with intermittent rotation of the drum, cooperating releasable stop means on said applicator means and frame for normally preventing movement of said roller toward the drum including a trip arm engageable by each label as the latter is carried around with said drum from said stack toward said path for releasing said stop means to permit movement of said roller toward the drum, whereby said roller is retained away from the drum in the absence of a label on the drum, and means for driving said conveyor means in synchronism with rotation of the drum.

6. A machine for applying labels to base members, comprising a frame, conveyor means on said frame for feeding said members in succession along a given path on said frame, a rotary drum on said frame tangent to said path including an axially extending, radially extendible and retractable pick-up bar, suction cups in the outer surface of said bar, a rack on said frame for holding a stack of labels with the uppermost label in the stack positioned to be engaged along one edge by said pick-up bar when the latter is extended with said drum in a predetermined angular position, means for intermittently rotating said drum so that the latter is periodically arrested in said predetermined angular position, spring means to urge said bar to its retracted position, a pivoted lever on said drum engageable with said bar to extend the latter against the action of said spring means when the lever is rocked in one direction, a recoprocable slide bar on said frame engageable with said lever to rock the latter in said one direction by movement of said slide bar in one direction, while said drum is in said predetermined angular position, spring means for urging said slide bar in the opposite direction, a reciprocable slide member on said frame movable parallel to said slide bar, means for reciprocating said slide member in synchronism with intermittent rotation of said drum, a movable pawl on said slide member having an extended position in which the pawl engages said slide bar to move the latter in said one direction thereof during movement of said slide member in one direction, depressiblle trip means disposed in said path for retaining said pawl in a retracted position, wherein it is disengaged from said slide bar during reciprocation of said slide member, said trip means being depressed by each base member moving along said path to release said pawl for engagement with said slide bar, whereby said pick-up bar is extended and retracted when said drum is in said predetermined angular position only if said trip means is depressed by a base member moving along said frame, means for evacuating said suction cups when said bar is extended and during subsequent rotation of said bar with the drum to said path, whereby the labels in said stack are successively withdrawn from the stack and carried around with the drum toward said path during continuous intermittent rotation of the drum, said drum having a cylindrical surface following said bar with respect to the direction of rotation of the drum which is flush with said outer surface of the pick-up bar when the latter is retracted, said outer surface of the pick-up bar being cylindrically curved and forming with said cylindrical drum surface a continuous cylindrically curved supporting surface for the label on the drum, an adhesive applicator on said frame for applying adhesive to the outer surface of each label as the latter is carried around with the drum from said stack toward said path including an applicator roller movable toward and away from said drum, means for urging the roller toward the drum, cooperating means on said drum and applicator means for moving said roller away from the drum and releasing the roller for movement toward the drum in synchronism with intermittent rotation of the drum, cooperating releasable stop means on said applicator means and frame for normally preventing movement of said roller toward the drum including a trip arm engageable by each label as the latter is carried around with said drum from said stack toward said path for releasing said stop means to permit movement of said roller toward the drum, whereby said roller is retained away from the drum in the absence of a label on the drum, and means for driving said conveyor means in synchronism with intermittent rotation of the drum.

7. A machine for applying labels to base members, comprising a frame, conveyor means on said frame for feeding said members in succession along a given path on said frame, a rotary drum on said frame tangent to said path including an axially extending, radially extendible and retractable pick-up bar, suction cups in the outer surface of said bar, a rack on said frame for holding a stack of labels with the uppermost label in the stack positioned to be engaged along one edge by said pick-up bar when the latter is extended with said drum in a predetermined angular position, means for intermittently rotating said drum so that the latter is periodically arrested in said predetermined angular position, means for extending and then retracting said pick-up bar while said drum is stationary in said predetermined angular position, means for evacuating said suction cups when said bar is extended and during subsequent rotation of said bar with the drum to said path, whereby the labels in said stack are successively withdrawn from the stack and carried around with the drum toward said path during continuous intermittent rotation of the drum, means for adjusting said rack to change the angle between said edge of the uppermost label on the stack and said pick-up bar, said drum having a cylindrical surface following said bar with respect to the direction of rotation of the drum which is flush with said outer surface of the pick-up bar when the latter is retracted, said outer surface of the pick-up bar being cylindrically curved and forming with said cylindrical drum surface a continuous cylindrically curved supporting surface for the label on the drum, an adhesive applicator on said frame for applying adhesive to the outer surface of each label as the latter is carried around with the drum from said stack toward said path, and means for driving said conveyor means in synchronism with intermittent rotation of the drum.

8. A machine for applying labels to base members, comprising a frame, conveyor means on said frame for feeding said members in succession along a given path on said frame, a rotary drum on said frame tangent to said path including an axially extending, radially extendable and retractable pick-up bar, suction cups in the outer surface of said bar, a rack on said frame for holding a stack of labels with the uppermost label in the stack positioned to be engaged along one edge of said pick-up bar when the latter is extended with said drum in a predetermined angular position, means for intermittently rotating said drum so that the latter is periodically arrested in said predetermined angular position, spring means to urge said bar to its retracted position, a pivoted lever on said drum engageable with said bar to extend the latter against the action of said spring means when the lever is rocked in one direction, a reciprocable slide bar on said frame engageable with said lever to rock the latter in said one direction by movement of said slide bar in one direction while said drum is in said predetermined angular position, spring means for urging said slide bar in the opposite direction, a reciprocable slide member on said frame movable parallel to said slide bar, means for reciprocating said slide member in synchronism with intermittent rotation of said drum, a movable pawl on said slide member having an extended position in which the pawl engages said slide bar to move the latter in said one direction thereof during movement of said slide member in one direction, depressible trip means disposed in said path for retaining said pawl in a retracted position, wherein it is disengaged from said slide bar during reciprocation of said slide member, said trip means being depressed by each base member moving along said path to release said pawl for engagement with said slide bar, whereby said pick-up bar is extended and retracted when said drum is in said predetermined angular position only if said trip means is depressed by a base member moving along said frame, means for evacuating said suction cups when said bar is extended and during subsequent rotation of said bar with the drum to said path including a valve on said drum which is opened by said lever upon rocking of the latter in said one direction thereof to effect evacuation of said suction cups and means for closing said valve to discontinue evacuation of said suction cups when said pick-up bar reaches said path, whereby the labels in said stack are successively withdrawn from the stack and carried around with the drum toward said path during continuous intermittent rotation of the drum, said drum having a cylindrical surface following said bar with respect to the direction of rotation of the drum which is flush with said outer surface of the pick-up bar when the latter is retracted, said outer surface of the pick-up bar being cylindrically curved and forming with said cylindrical drum surface a continuous cylindrically curved supporting surface for the label on the drum, an adhesive applicator on said frame for applying adhesive to the outer surface of each label as the latter is carried around with the drum from said stack toward said path, and means for driving said conveyor means in synchronism with intermittent rotation of the drum.

9. A machine for applying labels to base members, comprising a frame, means for feeding said members in succession along the frame, a rack on said frame for holding a stack of labels, an applicator mechanism on said frame for successively withdrawing labels from the top of said stack and applying the labels to the successive base members moving along the frame, and means for advancing said stack toward said applicator mechanism as the stack is consumed including a pressure foot pivotally supported on said frame for rocking toward and away from the top label in said stack, a spring for urging said foot toward said stack, means for periodically rocking said foot away from said stack, a ratchet wheel coaxial with the pivot axis of said foot, a ratchet pawl operatively connected with said foot and engaging said ratchet wheel so as to move along the periphery of the ratchet wheel during rocking of said foot, said periphery of the ratchet wheel having ratchet teeth and said pawl engaging behind a ratchet tooth when said pressure foot swings a given distance toward said stack, whereby subsequent swinging of said foot away from said stack rotates said ratchet wheel through a small angle, and means operatively connected to said ratchet wheel for advancing said stack toward said applicator mechanism in response to rotation of the ratchet wheel by said pawl.

References Cited in the file of this patent

UNITED STATES PATENTS

| | | |
|---|---|---|
| 1,518,080 | Kyler | Dec. 2, 1924 |
| 1,778,272 | Oertel | Oct. 14, 1930 |
| 2,247,623 | Von Hofe | July 1, 1941 |
| 2,349,309 | Schmidt et al. | May 23, 1944 |
| 2,391,694 | Everett | Dec. 25, 1945 |
| 2,545,292 | Magnusson | Mar. 13, 1951 |
| 2,635,776 | Cook et al. | Apr. 21, 1953 |
| 2,657,816 | Everett | Nov. 3, 1953 |
| 2,667,909 | Stobb | Feb. 2, 1954 |